US007633512B2

(12) United States Patent
Nakajima et al.

(10) Patent No.: US 7,633,512 B2
(45) Date of Patent: Dec. 15, 2009

(54) INFORMATION PROCESSING APPARATUS, INFORMATION PROCESSING METHOD AND PROGRAM

(75) Inventors: Kenji Nakajima, Kawasaki (JP); Naomi Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 11/523,646

(22) Filed: Sep. 20, 2006

(65) Prior Publication Data

US 2007/0274704 A1 Nov. 29, 2007

(30) Foreign Application Priority Data

May 25, 2006 (JP) ............... 2006-145569

(51) Int. Cl.
*G09G 5/00* (2006.01)
(52) U.S. Cl. .................................. 345/629
(58) Field of Classification Search .......... 345/629
See application file for complete search history.

(56) References Cited

U.S. PATENT DOCUMENTS

| 5,831,615 | A   | * | 11/1998 | Drews et al.    | 345/344  |
| 2002/0064308 | A1 | * | 5/2002  | Altman et al.   | 382/187  |
| 2002/0097270 | A1 | * | 7/2002  | Keely et al.    | 345/764  |
| 2004/0061842 | A1 | * | 4/2004  | Kasutani        | 355/40   |
| 2006/0212812 | A1 | * | 9/2006  | Simmons et al.  | 715/539  |
| 2006/0284738 | A1 | * | 12/2006 | Mori            | 340/995.14 |
| 2007/0176944 | A1 | * | 8/2007  | Brown et al.    | 345/592  |
| 2007/0206024 | A1 | * | 9/2007  | Rao             | 345/593  |

FOREIGN PATENT DOCUMENTS

JP 2001-100902 4/2001

* cited by examiner

*Primary Examiner*—Xiao M Wu
*Assistant Examiner*—Maurice McDowell, Jr.
(74) *Attorney, Agent, or Firm*—Fujitsu Patent Center

(57) ABSTRACT

An information processing apparatus connected to a display apparatus and an input apparatus includes an image recording part for recording image data, an input part for receiving a mark to be displayed under a condition of overlapping the image from the input apparatus, a mark recording part for recording data that represents the mark, an image data acquiring part for acquiring pixel information that represents a pixel group of a portion of the image overlapping the mark in a predetermined range from the image data, an adjusting part for calculating a value that represents an overlapping degree between the mark and a character, graphic, or picture contained in the image, using the pixel information, and obtaining a position or shape of the mark whose overlapping degree represented by the value is lowest, and an output part for allowing the display apparatus to display the mark in the position or shape obtained by the adjusting part under the condition that the mark overlaps the image. The information processing apparatus can add a mark to a display image effectively without allowing the mark added to the display image to cover a character, graphic, or picture of the image.

9 Claims, 13 Drawing Sheets

INFORMATION PROCESSING APPARATUS, INFORMATION PROCESSING METHOD AND PROGRAM

BACKGROUND OF THE INVENTION

1. Field of the Invention

The present invention relates to an information processing apparatus connected to a display apparatus for displaying an image and an input apparatus for inputting a mark to an image, for example, as in an information processing apparatus that provides functions such as a presentation and an electronic blackboard.

2. Description of Related Art

Conventionally, in a presentation, a lecture, or the like, an overhead projector (OHP), a projector connected to a notebook computer, or the like has been used. In a presentation using such apparatuses, a person who makes the presentation indicates a portion desired to be emphasized in a display image, for example, with a laser pointer, a fescue, a mouth cursor, or the like. In this case, handwriting drawn by the above-mentioned device does not remain in the indicated portion. Therefore, when an audience follows a talk while watching a display image, or watches the display image again so as to reconfirm it, there is a problem that the audience loses track of the emphasized portion.

In order to solve such a problem, a presentation system capable of putting a handwritten mark in a display image has been developed (for example, see "PointMaker" [online] produced by Hibino Corporation [searched on May 22, 2006], Internet <http://www. hibino.co.jp/topics/pointmaker.html>). Owing to this system, an emphasized portion can remain in a display image. Consequently, even in the case where the audience watches the display image again, the emphasized portion remains, so that it becomes easier for the person who makes a presentation to convey his/her intension.

In the above-mentioned presentation apparatus, electronic blackboard apparatus, and the like capable of putting a handwritten mark in a display image, an underlying or enclosing emphasis can be inputted easily while materials are being presented, resulting in enhanced convenience.

However, a handwritten mark added to a display image may cover a character, graphic, or picture by overlapping the contents of a presentation in the display image. Therefore, the contents of the display image become hard to read, confusing the order of things.

SUMMARY OF THE INVENTION

Therefore, with the foregoing in mind, it is an object of the present invention to provide an information processing apparatus capable of effectively adding a mark to a display image under the condition that the mark added to the display image hardly covers a character, graphic, or picture.

An information processing apparatus according to the present invention is connected to a display apparatus for displaying an image and an input apparatus. The apparatus includes: an image recording part for recording image data that represents an image to be displayed by the display apparatus; an input part for receiving handwriting data that represents a mark to be displayed under a condition of overlapping the image from the input apparatus; a mark recording part for recording the handwriting data that represents the mark received by the input part; an image data acquiring part for, in a case where at least a part of the mark is moved or deformed into a plurality of different positions or shapes respectively in a predetermined range in the image containing a position corresponding to the mark represented by the handwriting data recorded in the mark recording part, acquiring pixel information that represents a pixel group of a portion of the image overlapping the mark in each of the positions or shapes after the movement or deformation from the image data; an adjusting part for calculating a value that represents an overlapping degree between the mark in each of the plurality of different positions or shapes after the movement or deformation and a character, graphic, or picture contained in the image, using the pixel information, with respect to each of the positions or shapes after the movement or deformation, obtaining a position or shape of the mark whose overlapping degree represented by the value is lowest, and recording the position or shape in the mark recording part; and an output part for allowing the display apparatus to display the mark represented by the handwriting data received by the input part under a condition that the mark overlaps the image at a time of input, and allowing the display apparatus to display the mark in the position or shape obtained by the adjusting part under a condition that the mark overlaps the image, after deleting a display of the mark represented by the handwriting data.

The adjusting part can calculate a value that represents the overlapping degree between a mark in each of positions or shapes in the case where at least a part of the mark is moved or deformed to a plurality of different positions or shapes respectively in a predetermined range, and a character, graphic, or picture contained in an image, by using pixel information acquired by the image data acquiring part. More specifically, the adjusting part calculates the overlapping degree between a mark in each of a plurality of different positions or shapes in a predetermined range and an image, by using pixel information acquired by the image data acquiring part. This enables the adjusting part to obtain the position or shape of the mark whose overlapping degree is lowest in the predetermined range. The output part first allows the display apparatus to display a mark represented by the handwriting data received by the input part under the condition that the mark overlaps the image, and thereafter, allows the display apparatus to display the mark in the position or shape obtained by the adjusting part in place of the mark represented by the handwriting data. The display apparatus displays the mark, which is adjusted so that the overlapping with the character, graphic, or picture contained in the image is reduced, under the condition that the mark overlaps the image. Consequently, the mark can be effectively added to the display image, while the mark added to the display image via the input apparatus hardly covers the character, graphic, or picture contained in the image.

The information processing apparatus according to the present invention further includes: a reference figure recording part for previously storing data that represents a plurality of reference figures to be used for figure recognition; and a figure recognizing part for performing figure recognition with respect to the handwriting data with reference to the reference figure recording part, thereby recognizing a figure to be converted among the plurality of reference figures.

According to the above configuration, the adjusting part can convert handwriting into a mark in a shape based on a reference shape to be converted by the figure recognizing part, and adjust the mark so that the overlapping with the character, graphic, or picture contained in an image is reduced. This simplifies the calculation in the adjusting part. Furthermore, since the mark received by the input part from the input apparatus is converted into a shape based on the reference shape by the figure recognizing part, so that the handwriting inputted by the input apparatus is displayed by the display apparatus as a mark written out fairly into a reference shape.

In the information processing apparatus according to the present invention, it is preferable that the image data acquiring part acquires, as the pixel information, data containing a position and a pixel value of each pixel in the pixel group contained in the portion of the image overlapping the mark, with respect to the mark in each of the plurality of different positions or shapes after the movement or deformation, and the adjusting part calculates a value that represents an overlapping degree between the mark and a character, graphic, or picture contained in the image, using the value that represents a dispersion degree of the pixel value in the pixel group contained in the portion of the image overlapping the mark, with respect to the mark in each of the plurality of different positions or shapes after the movement or deformation.

The adjusting part can obtain a dispersion degree of a pixel value in a pixel group contained in an image that is to overlap a mark, from information representing the position and brightness of a pixel contained in pixel information acquired by the image acquiring part. The dispersion degree of the pixel value in the pixel group contained in the image that is to overlap the mark varies depending upon to which degree a character, graphic, or picture is contained in the image that is to overlap the mark. Therefore, the adjusting part can quantitatively calculate a value representing the overlapping degree between the mark and the character, graphic, or picture contained in the image, by using the value representing the dispersion degree of the pixel value in the pixel group contained in the image that is to overlap the mark.

In the information processing apparatus according to the present invention, it is preferable that the adjusting part uses the number of parts where the pixel value changes by a predetermined value or more between adjacent pixels in the pixel group, as the value that represents the dispersion degree of the pixel value in the pixel group contained in the portion of the image overlapping the mark.

According to the above configuration, the adjusting part can efficiently obtain a value representing the dispersion degree of a pixel value in a pixel group contained in a portion of an image overlapping a mark by simple calculation.

In the information processing apparatus according to the present invention, it is preferable that the adjusting part uses a variance of the pixel value of a pixel contained in the pixel group, as the dispersion degree of the pixel value in the pixel group contained in the portion of the image overlapping the mark.

According to the above configuration, the adjusting part can efficiently obtain a value representing the dispersion degree of a pixel value in a pixel group contained in a portion of an image overlapping a mark by simple calculation.

In the information processing apparatus according to the present invention, it is preferable that the adjusting part recognizes a character contained in the image in the predetermined range, using the pixel information that represents the pixel group in the image in the predetermined range containing the position corresponding to the mark represented by the data recorded in the mark recording part, and corrects the position or shape of the mark based on the recognized character.

The adjusting part corrects the position or shape of a mark based on characters recognized in an image in a predetermined range containing a position corresponding to the mark, so that the adjusting part can correct the mark to a position or shape corresponding to the characters.

In the information processing apparatus according to the present invention, it is preferable that the adjusting part adjusts a color of the mark so as to render at least a part of the adjusted mark transparent or semi-transparent.

The adjusting part renders the color of at least a part of a mark transparent or semi-transparent, whereby the mark is displayed so that the character, graphic, or picture covered with the mark can be seen through, when the mark is displayed under the condition of overlapping the image.

An information processing method according to the present invention is conducted by a computer that is connected to a display apparatus for displaying an image and an input apparatus, and includes an image recording part for recording image data that represents an image to be displayed by the display apparatus and a mark recording part for recording data that represents a mark to be displayed under a condition of overlapping the image. The method includes: an input process in which an input part provided in the computer receives handwriting data that represents a mark to be displayed under a condition of overlapping the image from the input apparatus, and records the handwriting data in the mark recording part; an acquiring process in which, in a case where at least a part of the mark is moved or deformed into a plurality of different positions or shapes respectively in a predetermined range in the image containing a position corresponding to the mark represented by the handwriting data recorded in the mark recording part, an image data acquiring part provided in the computer acquires pixel information that represents a pixel group of a portion of the image overlapping the mark in each of the positions or shapes after the movement or deformation from the image data; an adjusting process in which an adjusting part provided in the computer calculates a value that represents an overlapping degree between the mark in each of the plurality of different positions or shapes after the movement or deformation and a character, graphic, or picture contained in the image, using the pixel information, with respect to each of the positions or shapes after the movement or deformation, obtains a position or shape of the mark whose overlapping degree represented by the value is lowest, and records the position or shape in the mark recording part; and an output process in which an output part provided in the computer allows the display apparatus to display the mark represented by the handwriting data received by the input part under a condition that the mark overlaps the image at a time of input, and allows the display apparatus to display the mark in the position or shape obtained by the adjusting part under a condition that the mark overlaps the image, after deleting a display of the mark represented by the handwriting data.

An information processing program stored in a recording medium according to the present invention causes a computer, which is connected to a display apparatus for displaying an image and an input apparatus, and includes an image recording part for storing image data that represents an image to be displayed by the display apparatus, to execute: input processing of receiving handwriting data that represents a mark to be displayed under a condition of overlapping the image from the input apparatus, and recording the handwriting data in the mark recording part; image data acquiring processing of, in a case where at least a part of the mark is moved or deformed into a plurality of different positions or shapes respectively in a predetermined range in the image containing a position corresponding to the mark represented by the handwriting data recorded in the mark recording part, acquiring pixel information that represents a pixel group of a portion of the image overlapping the mark in each of the positions or shapes after the movement or deformation from the image data; adjusting processing of calculating a value that represents an overlapping degree between the mark in each of the plurality of different positions or shapes after the movement or deformation and a character, graphic, or picture contained in the image, using the pixel information, with respect to each of the positions or shapes after the movement or deformation, obtaining a position or shape of the mark whose overlapping degree represented by the value is lowest, and recording the position or shape in the mark recording part; and output processing of allowing the display apparatus to display the mark represented by the handwriting data received in the input processing under a condition that the mark overlaps the image at a time of input, and allowing the display apparatus to display the mark in the position or shape obtained in the adjusting processing under a condition that the mark overlaps the image, after deleting a display of the mark represented by the handwriting data.

According to the present invention, an information processing apparatus can be provided, which is capable of effectively adding a mark to a display image with the mark added to the display image hardly covering a character, graphic, or picture.

DETAILED DESCRIPTION OF THE INVENTION

Embodiment 1

Figure 1:
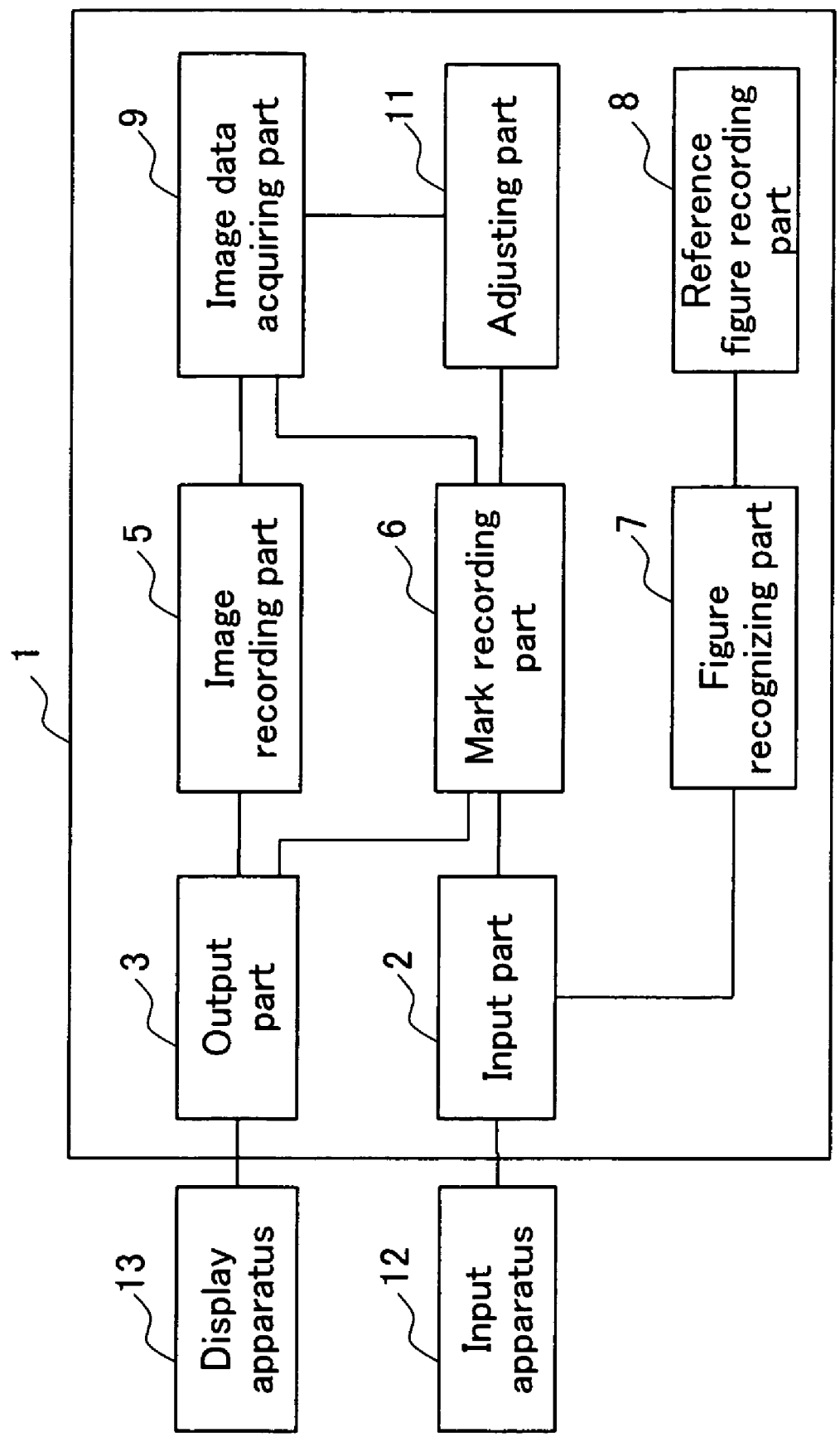
FIG. 1 is a functional block diagram showing a configuration of an information processing apparatus according to Embodiment 1.

FIG. 1 is a functional block diagram showing a configuration of an information processing apparatus according to the present embodiment. An information processing apparatus 1 shown in FIG. 1 includes an input part 2, an output part 3, an image recording part 5, a mark recording part 6, a figure recognizing part 7, a reference figure recording part 8, an image data acquiring part 9, and an adjusting part 11. Furthermore, the information processing apparatus 1 is connected to an input apparatus 12 and a display apparatus 13.

The information processing apparatus 1 can be realized with, for example, a computer such as a personal computer or a work station server. The respective functions of the input part 2, the output part 3, the figure recognizing part 7, the image data acquiring part 9, and the adjusting part 11 are realized when a CPU of the computer is operated in accordance with a predetermined program. Separate hardware corresponding to the above-mentioned each function is not necessarily present. Furthermore, the image recording part 5, the mark recording part 6, and the reference figure recording part 8 are embodied by a storage device contained in the computer or a storage device accessible from the computer. Furthermore, a program or a recording medium storing the program, for realizing the functions of the input part 2, the output part 3, the figure recognizing part 7, the image data acquiring part 9, and the adjusting part 11 with the computer, is also one embodiment of the present invention.

The display apparatus 13 displays an image based on image data sent from the information processing apparatus 1. The display apparatus 13 is realized by, for example, a display, a projector, or the like. The input apparatus 12 inputs information representing the position on a screen displayed by the display apparatus 13.

The input apparatus 12 is realized by, for example, a mouse, a touch panel, a tablet, a digitizer, or the like. The input apparatus 12 and the display apparatus 13 may be composed of one apparatus. More specifically, a display apparatus capable of inputting a position by pointing a display screen with a pen, the finger, or the like can be used for realizing the functions of the input apparatus 12 and the display apparatus 13. In the present embodiment, as an example, the case of using a tablet capable of performing a handwritten input on a screen with a pen for the input apparatus 12 will be described.

The information processing apparatus 1 is used, for example, in the case where a presentation is performed using an image displayed by the display apparatus 13. The information processing apparatus 1 has a function of displaying a mark inputted using the input apparatus 12 so that the mark overlaps an image displayed by the display apparatus. Therefore, a person who makes the presentation can write a mark, for example, in a portion to be noted, a portion to be emphasized, or the like in a displayed image.

The input part 2 receives data representing the position on the screen of the display apparatus 13 from the input apparatus 12. The data received by the input part 2 contains data representing a mark to be displayed under the condition that the mark overlaps an image displayed by the display apparatus 13. The mark is written, for example, in a portion to be noted, a portion to be emphasized, or the like in the image displayed by the display apparatus 13. As an exemplary case where the mark is inputted, a user inputs the mark in the tablet that is the input apparatus 12 with a pen. Furthermore, the mark may also be called annotation.

The data representing the mark received by the input part 2 is recorded in the mark recording part 6. The mark to be inputted is displayed under the condition of overlapping an existing image through the output part 3 as feedback during the input. The mark is expressed with data representing coordinates of a plurality of points in a time series constituting a path of the mark. Furthermore, the mark recording part 6 may contain data representing a color, a line width, a line type (e.g., a dotted line, a broken line, an alternate long and short dash line, etc.) in addition to coordinates, as the data representing the mark. These data can be inputted by the user with the input apparatus 12. In the present embodiment, as an example, the case where the data representing the mark is inputted by the user with the input apparatus, as the data representing handwriting.

The figure recognizing part 7 performs figure recognition with respect to the data representing the handwriting received by the input part 2, and converts the data into one of a plurality of reference figures previously recorded in the reference figure recording part 8. Examples of the plurality of reference figures include a line segment, a wavy line, a rectangular enclosing (rectangle), and a circular enclosing (oval or circle). More specifically, figures to be symbols described in a portion to be noted, a portion to be emphasized, or the like can be used as a plurality of reference figures. Information representing the reference figures is previously recorded in the reference figure recording part 8, for example, as dictionary data in which feature information representing features of reference figures is registered with respect to a plurality of reference figures. The figure recognizing part 7 performs figure recognition using such reference figures, thereby determining to which of a line segment, a wavy line, a rectangular enclosing (rectangle), and a circular enclosing (oval or circle) the handwriting of the inputted mark belongs. The figure recognizing part 7 converts the handwriting of the inputted mark into a reference figure to which the handwriting belongs.

Furthermore, the figure recognizing part 7 can also determine that the handwriting of the inputted mark does not belong to any of a line segment, a wavy line, a rectangular enclosing (rectangle), and a circular enclosing (oval or circle). In this case, the handwriting of the mark is not converted. For the figure recognition by the figure recognizing part 7, a known figure recognition technique or a gesture recognition technique can be used. The reference figures used in the present invention are not limited to the above-mentioned plurality of exemplary reference figures.

The image recording part 5 records image data displayed by the display apparatus 13. The image data represents, for example, pixel information in a display image. The pixel information contains, for example, the position of a pixel and a pixel value. The pixel value is the one owned by each pixel. The pixel value includes information representing, for example, binary data representing black and white, the brightness or color information of a pixel (e.g., the intensity based on three primary colors RGB of light), and the like.

The image data acquiring part 9 extracts and acquires a part of the image data based on the position of the mark represented by the data recorded in the mark recording part 6. Specifically, in the case where at least a part of the mark is moved or deformed to a plurality of different positions or shapes in a predetermined range including the position corresponding to the mark represented by the data recorded in the mark recording part 6, the image data acquiring part 9 acquires pixel information representing a pixel group in a portion of the image overlapping the mark in each position or shape after movement or deformation.

The adjusting part 11 obtains the position or shape of the mark in which the overlapping with a character, graphic, or picture contained in the image is reduced, using the pixel information acquired by the image data acquiring part 9. Specifically, the adjusting part 11 calculates a value representing the overlapping degree between the mark moved or deformed to various positions or shapes in a predetermined range including the mark, and the character, graphic, or picture contained in the image, using the pixel information acquired by the image data acquiring part 9. The adjusting part 11 obtains the position or shape of the mark in which the overlapping degree represented by the calculated value is lowest. Herein, the predetermined range is determined based on the previously set information.

The position or shape of the mark obtained by the adjusting part 11 is recorded in the mark recording part 6. The output part 3 allows the display apparatus 13 to display the mark based on the position or shape of the mark recorded in the mark recording part 6 under the condition that the mark overlaps the image represented by the image data of the image recording part 5.

Figure 2A:
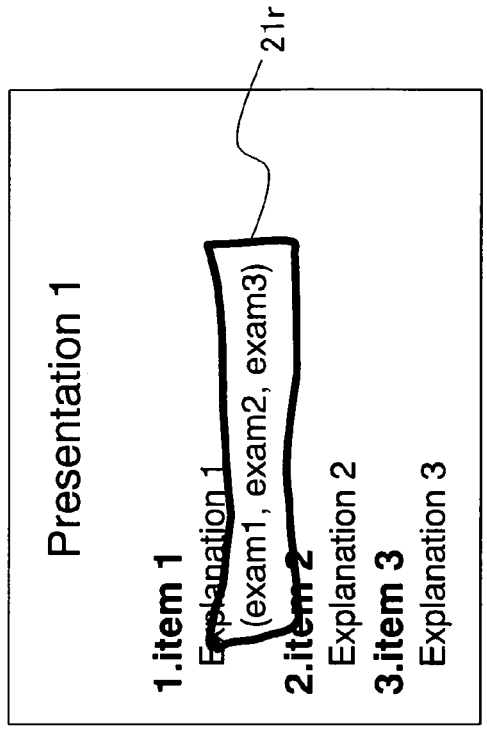
FIG. 2A shows an exemplary image displayed by a display apparatus.
Figure 2B:
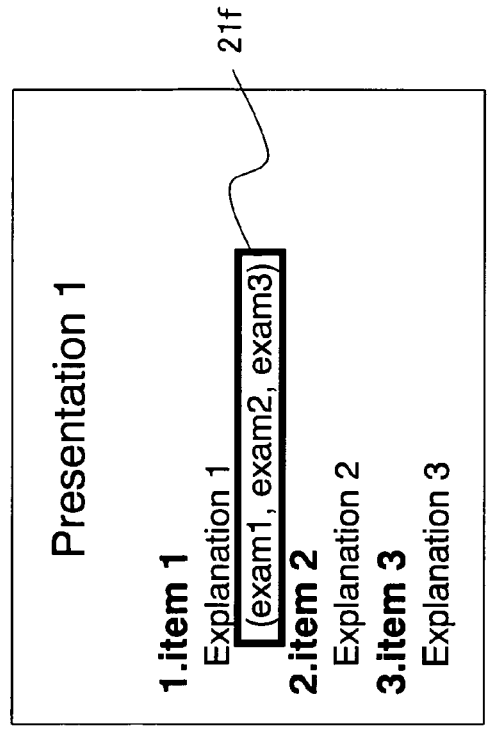
FIG. 2B shows an exemplary image immediately after a mark is inputted.

Herein, referring to FIGS. 2A to 2D, a specific example of the transition of a display image controlled by the information processing apparatus 1 will be described, in the case where a mark is inputted through the input apparatus 12 with respect to the image displayed by the display apparatus in the presentation. FIG. 2A shows an exemplary image displayed by the display apparatus 13 in the presentation. FIG. 2B shows an exemplary image immediately after the mark is inputted by the input apparatus 12. In the image shown in FIG. 2B, the path of a mark inputted with a pen is displayed as it is under the condition that the mark overlaps an original image shown in FIG. 2A, as a mark 21r. Herein, the path of the mark is handwriting from a start position (pen-down position) to an end position (pen-up position) of the input of positional information with a pen, as an example.

Figure 2C:
FIG. 2C shows an exemplary image in the case where a converted mark is displayed.
Figure 2D:
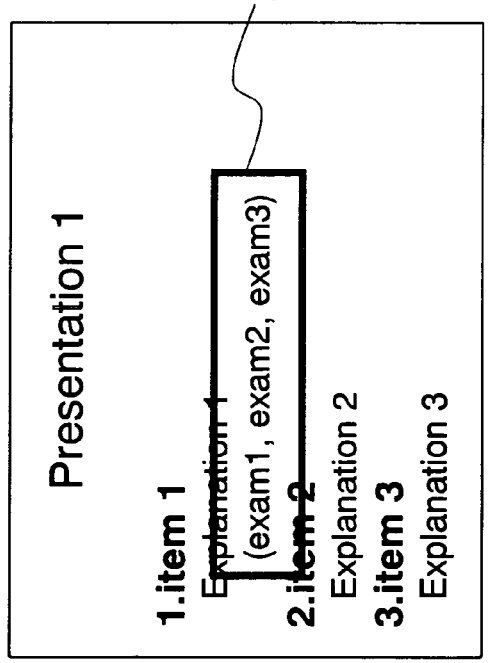
FIG. 2D shows an exemplary image in the case where an adjusted mark is displayed.

FIG. 2C shows an exemplary image in the case where the mark converted by the figure recognizing part 7 is displayed before being adjusted by the adjusting part 11. Herein, as an example, the inputted handwritten mark is converted into a rectangle that is one of the reference figures, and then, displayed as a rectangular mark 21a. FIG. 2D shows an exemplary image in the case where a mark 21f is displayed, which is adjusted so that the overlapping with characters in the image is reduced. As shown in FIGS. 2A to 2D, the handwritten mark 21r inputted with a pen is written out fairly in a rectangle, and displayed under the condition of being adjusted to the position and size in which the overlapping with the character, graphic, or picture included in the image is reduced. The inputted mark 21r shown in FIG. 2B and the mark 21a before being adjusted shown in FIG. 2C are not necessarily required to be displayed.

The original of the inputted mark is usually displayed as feedback of the inputted mark as shown in FIG. 2B. Then, the inputted mark is subjected to the adjustment processing in the figure recognizing part 7 and the adjusting part 11 in the information processing apparatus 1, and thereafter, the output part 3 can display final results as shown in FIG. 2D. During the input of the handwriting of the mark, the handwriting is displayed as feedback, whereby the user can input his/her handwriting while checking it, which improves the ease-of-use. Furthermore, when the input part 2 records the data representing the mark 21r in the mark recording part 6, the figure recognizing part 7 and the adjusting part 11 may adjust the recorded mark and display the adjusted mark 21f without displaying the mark.

Figure 3:
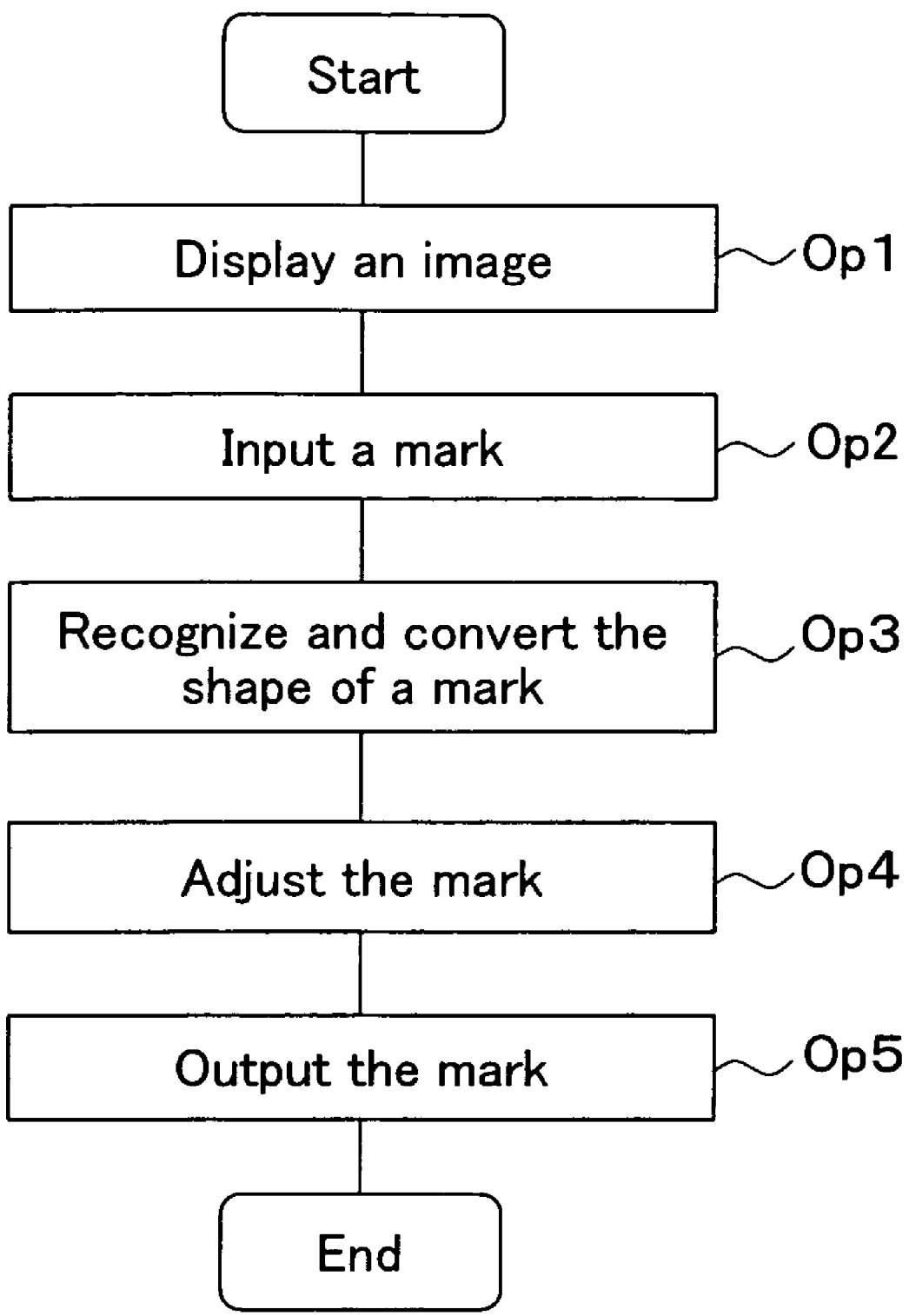
FIG. 3 is a flowchart showing the flow of an operation of the information processing apparatus.

Next, an exemplary operation will be described, in which the information processing apparatus 1 receives an input of a mark from the input apparatus 12, and allows the display apparatus 13 to display the mark. FIG. 3 is a flowchart showing the flow of an operation of the information processing apparatus 1. First, the output part 3 outputs the image data recorded in the image recording part 5 to the display apparatus 13. An image is displayed by the display apparatus 13 (Op 1).

The input part 2 receives the input of the mark from the input apparatus 12, and records data representing the inputted mark in the mark recording part 6 (Op2). The input part 2 records, for example, the data, which represents the handwriting of a pen from the commencement of an input of positional information by the operation such as pen-down to the completion of the input by the operation such as pen-up in the input apparatus 12, in the mark recording part 6 as data representing a mark. The output part 3 displays the inputted handwriting as feedback of the inputted handwriting even during the input under the condition that the handwriting overlaps an image represented by the image data of the image recording part 5.

When the data representing the inputted mark, i.e., the data representing the inputted handwriting is recorded, the figure recognizing part 7 performs figure recognition with respect to the data representing the recorded handwriting, thereby converting the inputted handwriting into one of a plurality of reference figures previously recorded (Op3). For example, as the figure recognition processing, the figure recognizing part 7 takes out a plurality of feature points to be representative points from the data representing the handwriting, and then, extracts feature information representing the features regarding the handwriting based on the positional relationship of the feature points. The figure recognizing part 7 matches the feature information of the handwriting with dictionary data in which feature information of the reference figures are previously registered, thereby determining a reference figure to which the handwriting belongs. The handwriting is converted into the determined reference figure. A known technique for converting the handwriting into a reference figure is described, for example, in JP 2001-100902 A.

In the case where the figure recognizing part 7 determines that the inputted handwriting does not belong to any of a plurality of reference figures previously set, the output part 3 outputs the inputted handwriting to the display apparatus 13 as it is.

The adjusting part 11 further updates the data representing the mark converted by the figure recognizing part 7, and adjusts the mark so that the overlapping thereof with the character, graphic, or picture contained in the image is reduced (Op4). A specific example of the processing in which the adjusting part 11 adjusts the mark will be described later, regarding the case where the mark is a rectangular enclosing (rectangle) and a circular enclosing (oval or circle).

The output part 3 reads the data representing the adjusted mark from the mark recording part 6, and outputs it to the display apparatus 13 (Op5). Consequently, in the display apparatus 13, the image represented by the image data in the image recording part 5 and the adjusted mark are displayed under the condition of overlapping each other. In the display apparatus 13, a mark adjusted so as not to cover the character, graphic, or picture in the image represented by the image data is displayed.

(Specific Example of the Processing of Adjusting a Rectangular Enclosing Mark).

Figure 4:
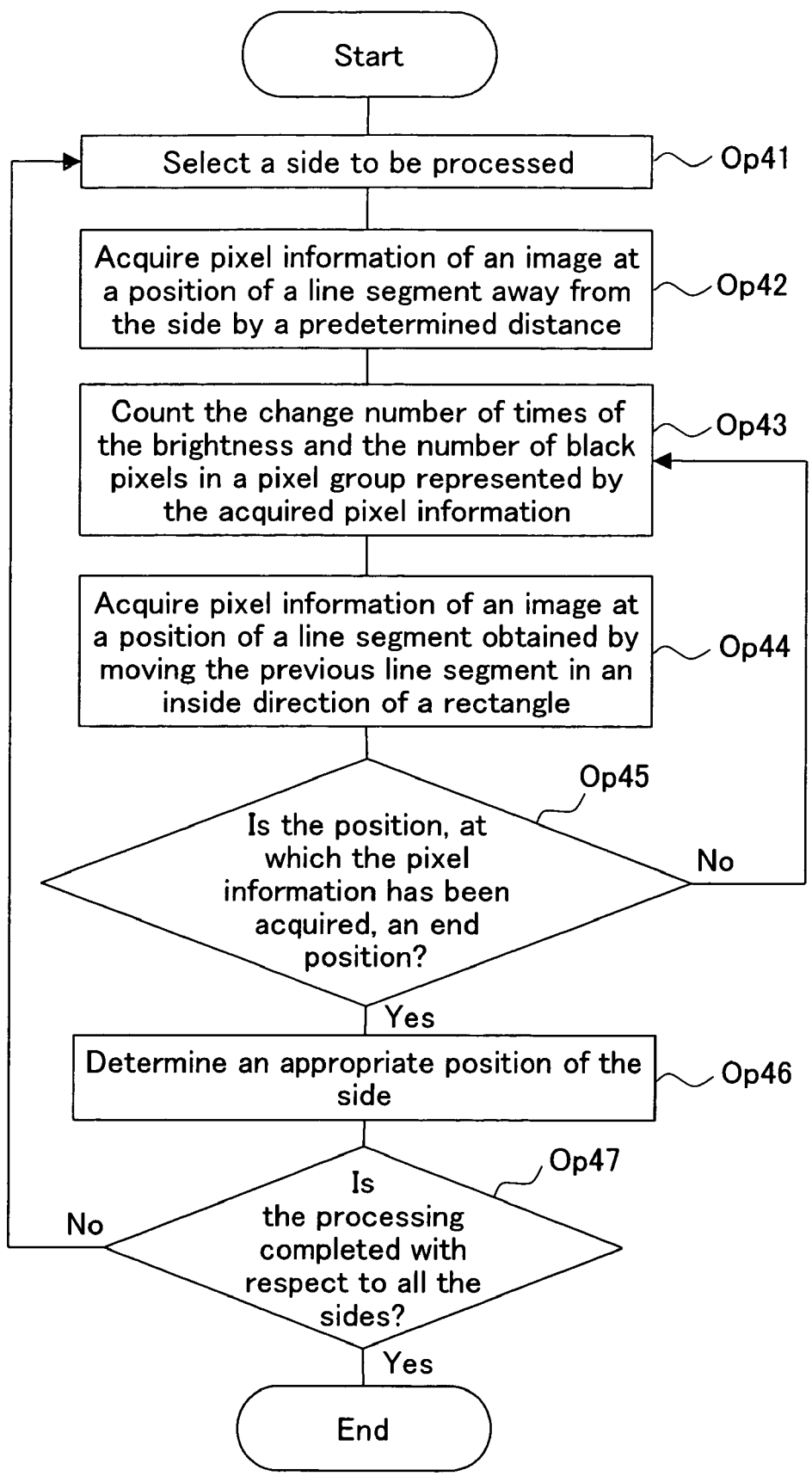
FIG. 4 is a flowchart showing a specific example of the processing of adjusting a rectangular enclosing mark.

FIG. 4 is a flowchart showing a specific example of the processing in which the adjusting part 11 and the image data acquiring part 9 adjust a mark so that the overlapping with the character, graphic, or picture is reduced, in the case where the mark is a rectangular enclosing (rectangle). The specific example shown in FIG. 4 is the processing of calculating an optimum rectangle by calculating an optimum position regarding each side of a rectangle. Hereinafter, the case where the brightness of a pixel of an image is displayed by binary data representing white or black will be described.

The adjusting part 11 first reads data representing a rectangular mark recorded in the mark recording part 6, and selects a side to be processed in the rectangle (Op41). The image data acquiring part 9 acquires pixel information of an image at the position corresponding to a line segment away from the selected side by a predetermined distance (Op42). Herein, the predetermined distance is determined, for example, by a previously set value.

Figure 5A:
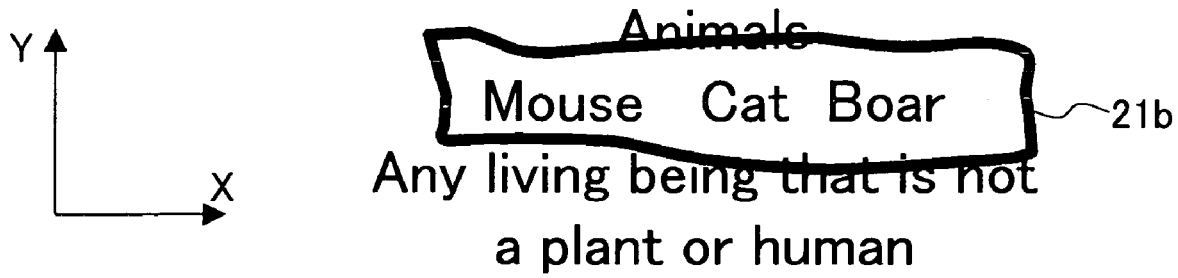
FIG. 5A and 5B respectively show an exemplary display image in the case where a mark and an image are displayed under the condition of overlapping each other.
Figure 5B:
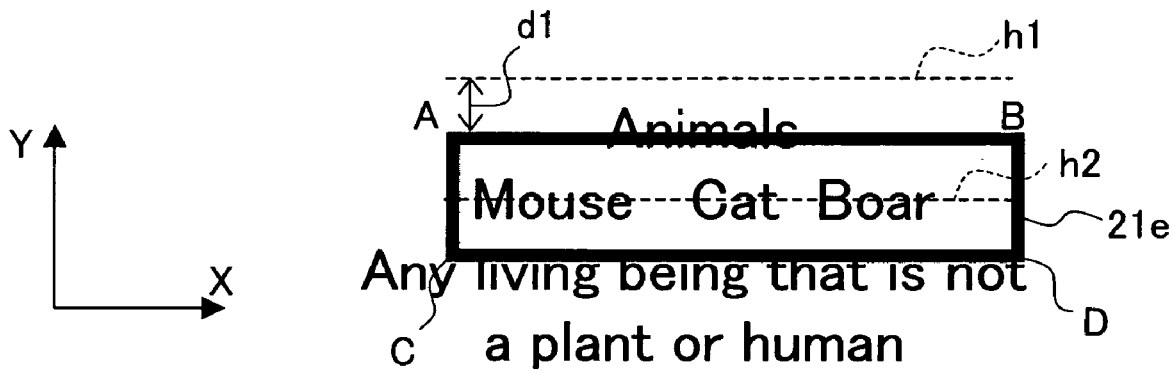

Specific examples of the processing in Op41 and Op42 will be described with reference to FIGS. 5A and 5B. FIGS. 5A and 5B show an exemplary display image in the case where a mark and an image are displayed under the condition of overlapping each other. In FIGS. 5A and 5B, it is assumed that the vertical direction of an image is a Y-axis, and the horizontal direction thereof is an X-axis. The example shown in FIG. 5A corresponds to the case where a mark 21b of the inputted handwriting is displayed under the condition of overlapping the image. The mark 21b is recognized as a rectangle by the figure recognizing part 7, and converted into a mark 21e of a rectangle ABCD as shown in FIG. 5B. In the example shown in FIG. 5B, the mark 21e constituted by the rectangle ABCD overlaps an image containing character strings.

Herein, as an example, the case where a side AB is selected as a subject to be processed in Op41 will be described. In this case, in Op42, the image data acquiring part 9 acquires pixel information of an image at the position corresponding to a line segment h1 away from the side AB to the outside of the rectangle ABCD by a distance d1. The distance d1 is a half length of the side AC. Thus, the distance d1 may be determined based on the size of the rectangle ABCD. The length of the distance d1 is an example, and the present invention is not limited thereto.

The image data acquiring part 9 acquires, for example, the brightness and coordinates of pixels in a row along the line segment h1 as pixel information. The pixel information to be acquired is not limited to pixel information of pixels in a row, and pixel information of pixels in a plurality of rows may be acquired.

In a series of pixel groups represented by the pixel information acquired by the image data acquiring part 9, the adjusting part 11 counts the number of times by which the brightness changes between adjacent pixels and the number of black pixels (Op43). In the case where the image represented by the pixel information contains a part of the character, graphic, or picture, the brightness changes from white to black or vice versa between adjacent pixels, and a black pixel is present in a series of pixel groups represented by the pixel information. Therefore, the sum of the change number of times of the brightness in the pixel group represented by the pixel information and the number of black pixels can be set to be the value that represents to which degree the character, graphic, or picture is contained in the image corresponding to the pixel information. More specifically, the above-mentioned sum becomes the value that represents the overlapping degree between the mark and the character, graphic, or picture in the case where the mark is displayed at the position of a pixel group of pixel information.

In the example shown in FIG. 5B, the sum of the change number of times of the brightness in the pixel group contained in an image at the position corresponding to the line segment h1 and the number of black pixels is set to be the value that represents the overlapping degree with the character in the case where the side AB is moved in parallel to the position of the line segment h1. If none of the character, graphic, or picture is present in the image, the sum of the number of times by which the brightness changes between adjacent pixels and the number of black pixels becomes 0. Furthermore, the sum increases/decreases in accordance with the amount of the character, graphic, and picture.

The image data acquiring part 9 acquires pixel information of an image at the position corresponding to a line segment obtained by moving the line segment at the position whose pixel information has been acquired previously to the inside of the rectangle by a minute distance Δd (Op44). At this time, it is preferable that the minute distance Δd corresponds to one pixel. This is because an optimum minute distance cannot be found with two or more pixels. The adjusting part 11 determines whether or not the position at which the pixel information is acquired in Op4 is a previously determined end position (Op45). Because of this, the adjusting part 11 determines whether or not the acquisition of the pixel information should be ended. Herein, the end position is determined by, for example, a previously set value.

In the case where the position whose pixel information has been acquired is not the predetermined end position (No in Op45), the adjusting part 11 counts the number of times by which the brightness changes between adjacent pixels in a series of pixel groups represented by the pixel information acquired by the image data acquiring part 9 in Op44 and the number of black images (Op43). Thus, the processings in Op43 and Op44 are repeated until the position whose pixel information has been acquired by the image data acquiring part 9 in Op43 reaches the predetermined end position (Yes in Op45). Because of this, the value representing the overlapping degree between the side at each position in the case where the side is moved in parallel in a predetermined range, and the character, graphic, or picture contained in the image.

In the example shown in FIG. 5B, in the case where the side AB is moved in parallel from the position of the line segment hi to a position of a line segment h2, for example, on a minute distance Δd basis, the value representing the overlapping degree between the image and the character at each position is obtained. The line segment h2 in FIG. 5B shows an example of a predetermined end position. The line segment h2 is away from the side AB to the inside of the rectangle ABCD by a half distance of the side AC. Thus, the end position can be determined in accordance with the size of the rectangle.

Furthermore, the adjusting part 11 may determine the end position dynamically. For example, the adjusting part 11 successively obtains a value that represents the overlapping degree between the image and the character at each position in the case where the side AB is moved in parallel from the position of the line segment h1 on the minute distance Δd basis. The position may be set to be the end position, at a time when the value representing the overlapping degree takes a local minimum value equal to or lower than a threshold value in the rectangle ABCD, and then, a value larger than the local minimum value continues a predetermined number of times.

In this case, the local minimum value corresponds to an optimum position. This eliminates the necessity of investigating all the positions from the position of the line segment h1 to the position of the line segment h2 to enhance the efficiency. Furthermore, in the case where, among the values representing the overlapping degree, local minimum values smaller than a predetermined threshold value are found at a plurality of portions, the position closet to the position (investigation starting position) of the line segment h1 may be set to be an optimum position.

Based on the value representing the overlapping degree at each position in the case where a side to be processed is moved in parallel, the adjusting part 11 obtains an optimum position of the side (Op46). For example, the adjusting part 11 can set the position, at which the sum of the change number of times of the brightness and the number of black pixels is smallest, to be the optimum position. In the case where the position at which the sum of the change number of times of the brightness and the number of black pixels is smallest is present inside and outside of the rectangle, respectively, the adjusting part 11 can determine the position inside the rectangle and dose to a side of a circumscribed rectangle to be an optimum position. By setting the inside of the rectangle to be an optimum position preferentially, for example, an enclosing can be prevented from becoming larger than that by a user, or the enclosed number of digits can be prevented from being reduced to one irrespective of whether at least two digits are enclosed.

Furthermore, in the case where the position at which the sum of change number of times of the brightness and the number of black pixels is smallest continues in a predetermined range, an arbitrary position in the range can be set to be an optimum position. For example, in the image shown in FIG. 5B, the brightness of pixels in a portion between character strings "Animals" and "Mouse Cat Boar" becomes all white. Therefore, in the case where the side AB is moved on the minute distance Δd basis in that portion, the sum of the change number of times of the brightness of the pixel group and the number of black pixels becomes 0 at any position. In such a case, the position of a line segment away from a line segment overlapping an upper end of the character string "Mouse Cat Boar" by a predetermined distance can be set to be the optimum position. This predetermined distance can be determined by the previously set value.

Thus, the adjusting part 11 can obtain an optimum position of a side where the overlapping with the character, graphic, or picture is reduced. The method for obtaining an optimum position in Op46 is not limited to the above example.

The processings in Op42 to Op46 are repeated with respect to each side of the rectangle (Op47). When an optimum position is obtained with respect to each side (Yes in Op47), the processing is completed. Consequently, data representing a rectangle that overlaps the character, graphic, or picture contained in the image by a smallest amount can be obtained. The adjusting part 11 updates the data representing the mark in the mark recording part 6 to data representing the rectangle obtained in the above processing. More specifically, the position of each side of the rectangle represented by the data recorded in the mark recording part 6 is updated to the position obtained in Op47. Such a mark is outputted to the display apparatus 13 by the output part 3, whereby a mark is displayed so as not to overlap the character, graphic, or picture contained in the image, as in the example shown in FIG. 2D.

Figure 6:
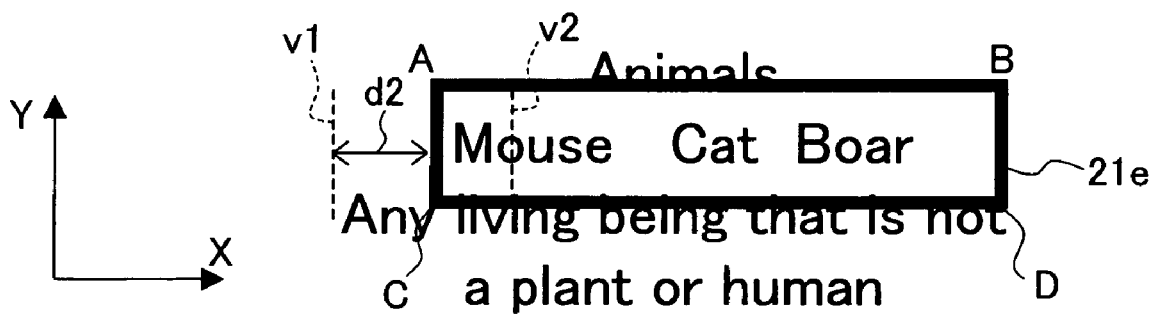
FIG. 6 shows an exemplary display image in the case where a mark and an image are displayed under the condition of overlapping each other.

The range in which pixel information is obtained may vary between the case of a vertical side of a rectangle and the case of a horizontal side thereof. For example, as shown in FIG. 6, when an optimum position of a side AC of the rectangle ABCD is obtained, the range in which the image data acquiring part 9 acquires pixel information can be set between a line segment v1 and a line segment v2. In FIG. 6, as an example, a distance d2 between the line segment v1 and the side AC becomes ⅕ of the side AB. On the other hand, the distance d1 shown in FIG. 5B is ½ of the side AC.

For example, in the case where the vertical side of the rectangle is ½ of the horizontal side thereof, d1 can be set to be ½ of the vertical side, and d2 can be set to be ⅕ of the horizontal side. Furthermore, in the case where the vertical side of the rectangle is longer than ½ of the horizontal side, and is less than twice the horizontal side, d1 can be set to be ½ of the vertical side, and d2 can be set to be ½ of the horizontal side. In the case where the vertical side is twice or more the horizontal side, d1 can be set to be ⅕ of the vertical side, and d2 can be set to be ½ of the horizontal side. Thus, by setting the movement range of the vertical side and the movement range of the horizontal side in accordance with the shape of the rectangle, a processing efficiency can be enhanced.

Furthermore, in Op43, the adjusting part 11 counts the change number of times of the brightness and the number of black pixels, and sets the sum thereof to be a value representing the overlapping degree between the mark and the character, graphic, or picture. However, the adjusting part 11 may count at least one of them, and set the number thereof to be a value representing the overlapping degree between the mark and the character, graphic, or picture.

In the above example, an image is represented by binary data. However, even in the case of a gray-scale image or a color image instead of the image represented by binary data, a value representing the overlapping degree between the mark and the character, graphic, or picture can be obtained from the pixel information thereof. In the case of the gray-scale image, for example, the adjusting part 11 can obtain a value representing the overlapping degree between the mark and the character, graphic, or picture by calculating a variance of the brightness representing shades of gray contained in the acquired pixel information. In the case of the color image, the adjusting part 11 similarly can obtain a value representing the overlapping between the mark and the character, graphic, or picture by obtaining the magnitude of a variance of the brightness (e.g., an RGB value) representing a color or converting a color image into a gray-scale image to obtain a variance of the brightness representing shades of gray.

Furthermore, in the case of the color image, the distance of color is considered as a criterion representing the degree of color difference. For example, in the case where the color of pixels is represented by three primary colors RGB, each value of R, G, and B is assumed to be three-dimensional coordinate values, whereby the distance in a three-dimensional coordinate can be set to be a criterion. The method for expressing the color of pixels is not limited to the case of expressing them with three primary colors RGB.

The value calculated as the one representing the overlapping degree between the mark and the character, graphic, or picture is not limited to a variance of the brightness, and may be another value representing the variation in brightness. Furthermore, for example, the difference between the brightness of each pixel contained in the acquired pixel group and the brightness representing the color of a mark may be calculated to obtain the variance of the difference.

(Specific Example of an Underline)

The above example is the case where a mark is a rectangle. However, even in the case where the mark is a line segment (underline) extending in a horizontal direction of an image, the adjusting part 11 can obtain an optimum position by moving the mark in parallel and calculating the overlapping degree with the character, graphic, or picture at each position. As an example, the adjusting part 11 can obtain an optimum position of a mark that is a line segment, in the same way as in the processing of obtaining an optimum position regarding one side of a rectangle, in the processing shown in FIG. 4.

Furthermore, still another example will be described below. After the figure recognizing part 7 recognizes the shape of handwriting data of an underline inputted by the input apparatus 12, and acquires data representing a mark of a line segment, the adjusting part 11 investigates the optimum position of the mark. In this case, the investigation range may not be determined previously. The investigating part 11 alternately repeats the processing of moving the position of a line segment upward from an original position and calculating a value representing an overlapping degree, and the processing of moving the position of the line segment downward from the original position and calculating a value representing an overlapping degree. In this repetition, the adjusting part 11 can set the initially found optimum position as a destination position of a straight line.

Furthermore, instead of the following: the figure recognizing part 7 shapes the handwriting data of an inputted underline by shape recognition, and the adjusting part 11 searches for an optimum place, the adjusting part 11 may search for an optimum place regarding a mark representing a handwritten underline in a shape represented by the inputted handwriting data. In this case, for example, the adjusting part 11 calculates a circumscribed rectangle of the inputted handwriting data, and sets a line segment at the center of the circumscribed rectangle to be a reference position. In the same way as the above, the adjusting part 11 alternately repeats the processing of moving the underline represented by the handwriting data upward from the reference position and calculating a value representing the overlapping degree, and the processing of moving the underline downward from the reference position and calculating a value representing the overlapping degree. In this repetition, the adjusting part 11 can set the initially found optimum position to be a destination position of a straight line.

(Specific Example of the Processing of Adjusting an Oval Mark)

Figure 7A:
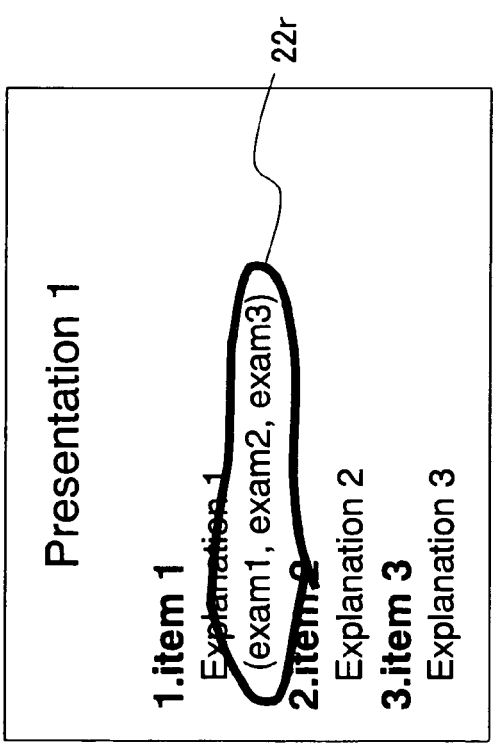
FIG. 7A shows an exemplary image immediately after a mark is inputted.
Figure 7B:
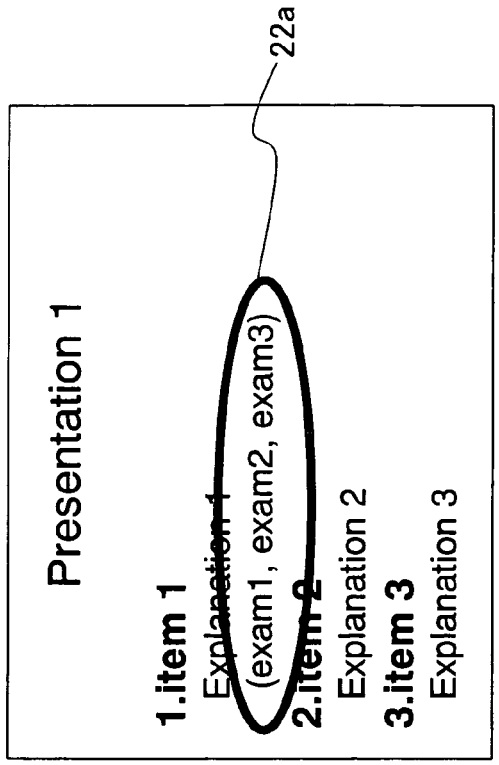
FIG. 7B shows an exemplary image in the case where a converted mark is displayed.
Figure 7C:
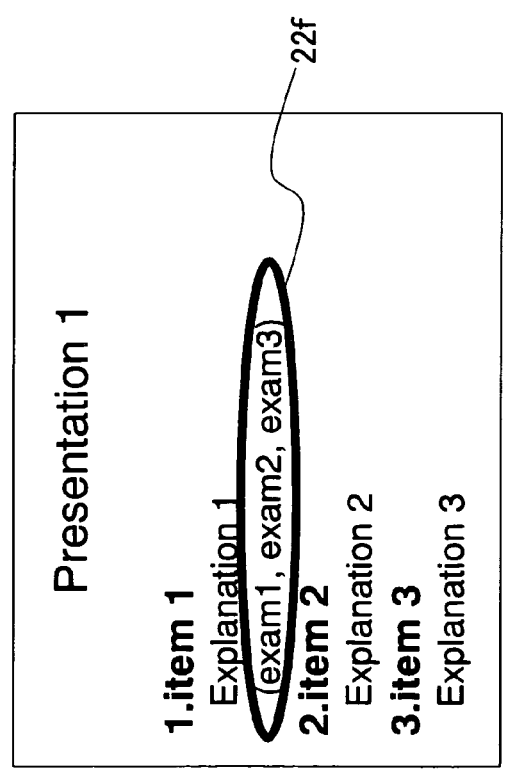
FIG. 7C shows an exemplary image in the case where an adjusted mark is displayed.

Next, a specific example of the processing will be described, in which the adjusting part 11 and the image data acquiring part 9 adjust a mark in the case where the mark is an oval. FIGS. 7A to 7C show a specific example of the transition of a display image controlled by the information processing apparatus 1, in the case where a mark is inputted via the input apparatus 12 with respect to an image displayed by the display apparatus 13. FIG. 7A shows an example of an image immediately after a mark 22r is inputted by the input apparatus 12. FIG. 7B shows an exemplary image in the case where a converted mark 22a is displayed by the figure recognizing part 7. Herein, the inputted handwritten mark 22r is converted into the mark 22a in an oval shape. FIG. 7C shows an exemplary image in the case where a mark 22f adjusted so that the overlapping with the character, graphic, or picture contained in the image is reduced by the adjusting part 11 is displayed. As shown in FIGS. 7A to 7C, the handwritten mark 22r inputted with a pen is written out fairly into the oval mark 22a, and is displayed under the condition of being adjusted to the mark 22f in a position and a size where the overlapping with the character, graphic, or picture contained in the image is reduced. Herein, in the same way as in the rectangle, the output part 3 can display FIG. 7A as feedback, and display the adjusted mark in FIG. 7C without particularly displaying FIG. 7B in the middle.

Figure 8:
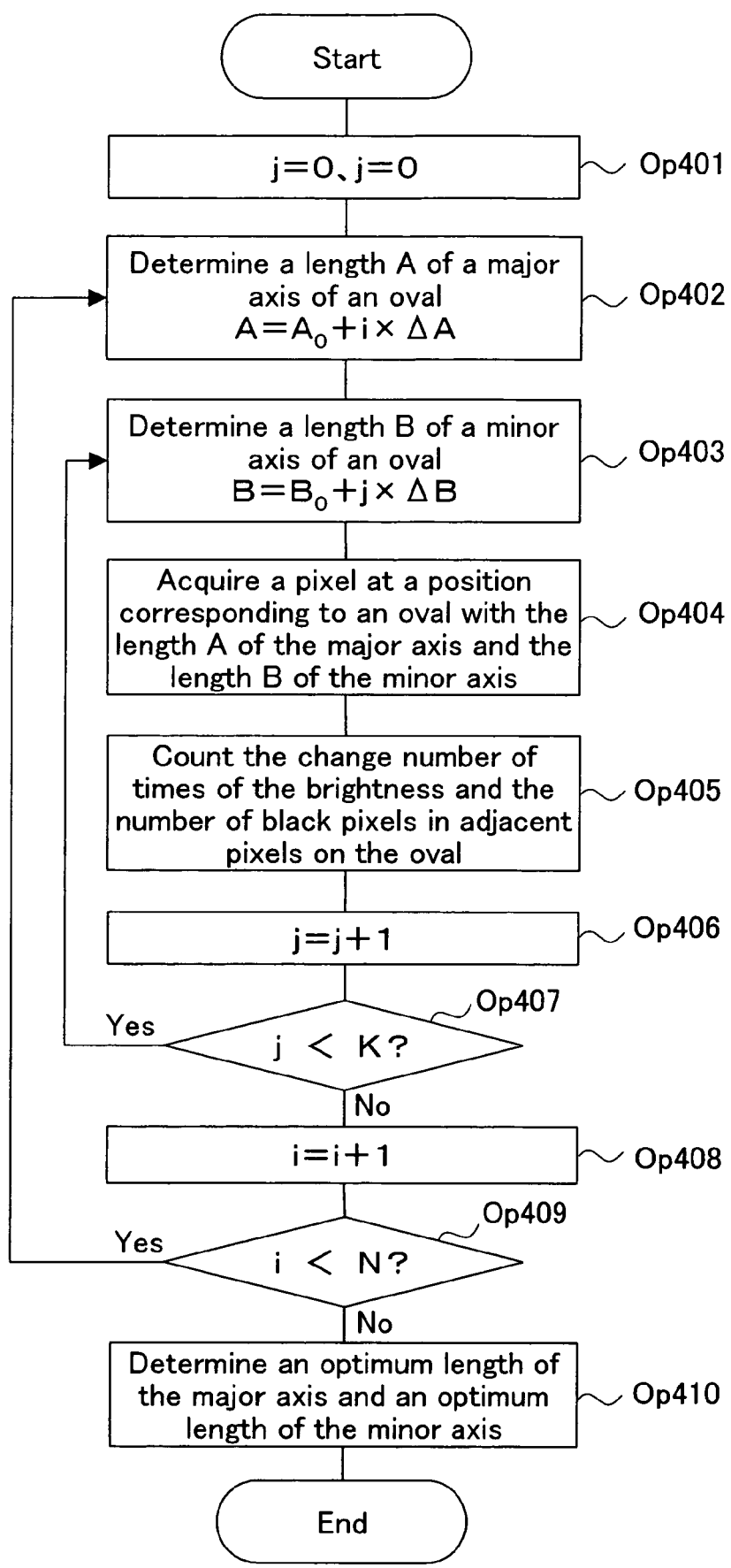
FIG. 8 is a flowchart showing a specific example of the processing of adjusting an oval mark.

FIG. 8 is a flowchart showing a specific example of the processing in which the adjusting part 11 and the image data acquiring part 9 adjust an oval mark so that the overlapping with the character, graphic, or picture is reduced. The specific example shown in FIG. 8 is the processing of calculating an optimum oval by gradually changing the length of a major axis of the oval represented by a mark recorded in the mark recording part 6 and the length of a minor axis thereof, respectively, thereby calculating each optimum length of the minor axis and the major axis.

The adjusting part 11 first initializes variables "i" and "j" to 0 (Op401). The variable "i" increases by one every time a length A of the major axis of the oval changes, and the variable "j" increases by one every time a length B of the minor axis of the oval changes.

Next, the adjusting part 11 determines the length A of the major axis of the oval (Op402). The length A of the major axis of the oval is determined, for example, by the following Expression 1.

$$A = A_0 + i \times \Delta A \quad (1)$$

In the above Expression 1, $A_0$ is a minimum value of the length of the major axis. $\Delta A$ is a change amount of the length of the major axis. More specifically, the length A of the major axis is $A_0$ at i=0, and increases by $\Delta A$ every time "i" increases by one.

The adjusting part 11 also determines the length B of the minor axis of the oval (Op403). The length B of the minor axis is determined, for example, by the following Expression 2.

$$B = B_0 + i \times \Delta B \quad (2)$$

In the above Expression 2, $B_0$ is a minimum value of the length of the minor axis. $\Delta B$ is a change amount of the length of the minor axis. More specifically, the length B of the minor axis is $B_0$ at j=0, and increases by $\Delta B$ every time "j" increases by one. The above-mentioned $A_0$, $\Delta A$, $B_0$, $\Delta B$ are determined, for example, by previously set values.

Furthermore, the values of $A_0$ and $B_0$ may be determined by calculation based on the data of an inputted mark. For example, when the figure recognizing part 7 recognizes the mark 22r inputted by hand in FIG. 7A as an oval of the mark 22a in FIG. 7B inside thereof (without displaying it), the investigating part 11 first investigates an optimum position of a circumscribed rectangle in the same way as in the above rectangle, using the circumscribed rectangle of the oval. The horizontal length and the vertical length of a rectangle (circumscribed rectangle) in which the overlapping is reduced, found by the investigation, can be set to be a minimum value $A_0$ of a length of a major axis of an oval to be investigated subsequently and a minimum value $B_0$ of a length of a minor axis thereof.

The adjusting part 11 calculates coordinates of the path of an oval in the case where the length of a major axis of the oval represented by a mark recorded in the mark recording part 6 is changed to A determined in Op402 and the length of a minor axis thereof is changed to B determined in Op403. The image data acquiring part 9 acquires pixel information of an image corresponding to the calculated coordinates from the image recording part 5 (Op404).

In the case where the brightness of a pixel contained in the pixel information of the image is represented by binary data representing white or black, the adjusting part 11 counts the change number of times of the brightness between adjacent pixels on the path of the oval and the number of black pixels, using the acquired pixel information (Op405). The adjusting part 11 sets the sum of the change number of times of the brightness between adjacent pixels and the number of black pixels to be a value representing the overlapping degree between the oval and the character, graphic, or picture contained in the oval image. After that, the adjusting part 11 adds 1 to "j" (Op406), and determines whether or not "j" is smaller than the previously determined upper limit value K (K=natural number). In the case where "j" is smaller than the upper limit value K (Yes in Op407), the length B of the minor axis is calculated again (Op403), and the processings in Op404 to Op406 are repeated. Herein, K is, for example, the value of "j" when the length B of the minor axis becomes a minimum that exceeds the length of a vertical side of the circumscribed rectangle of the oval of the mark 22a in FIG. 7B. The processings in Op404 to Op406 are repeated from j=0 to J=K. Because of this, the adjusting part 11 changes the length B of the minor axis of the oval that is the shape of a mark on $\Delta B$ basis from $B_0$ to $(B_0+K \times \Delta B)$, thereby obtaining a value that represents the overlapping degree between the mark and the character, graphic, or picture regarding each shape.

When the processings in Op403 to Op406 are repeated from j=0 to J=K, the adjusting part 11 adds 1 to "i" (Op408), and determines whether or not "i" is smaller than a previously determined upper limit value N (N=natural number) (Op409). In the case where "i" is smaller than the previously determined upper limit value N (Yes in Op409), the length A of the major axis is calculated again (Op402), the processing of changing the length B of the minor axis in Op403 to Op406 to obtain a value that represents the overlapping degree between the mark and the character, graphic, or picture regarding each shape, and 1 is added to "i" (Op408). The processings in Op402 to Op408 are repeated from i=1 to i=N. Because of this, the adjusting part 11 changes the length A of the major axis of the oval that is the shape of a mark by on $\Delta A$ basis from $A_0$ to $(A_0+N \times \Delta A)$. Then, every time the length A of the major axis changes by $\Delta A$, the length B of the minor axis is changed on $\Delta B$ basis from $B_0$ to $(B_0+K \times \Delta B)$, whereby the value that represents the overlapping degree between the mark and the character, graphic, or picture is obtained. Consequently, the value that represents the overlapping degree between the mark and the character, graphic, or picture can be obtained in the case where the major axis and the minor axis of the oval that is the shape of a mark recorded in the mark recording part 6 is changed variously. Herein, for example, N is the value of "i" when the length A of the major axis becomes a minimum that exceeds the length of a horizontal side of the circumscribed rectangle of the oval of the mark 22a in FIG. 7B.

Figure 9A:
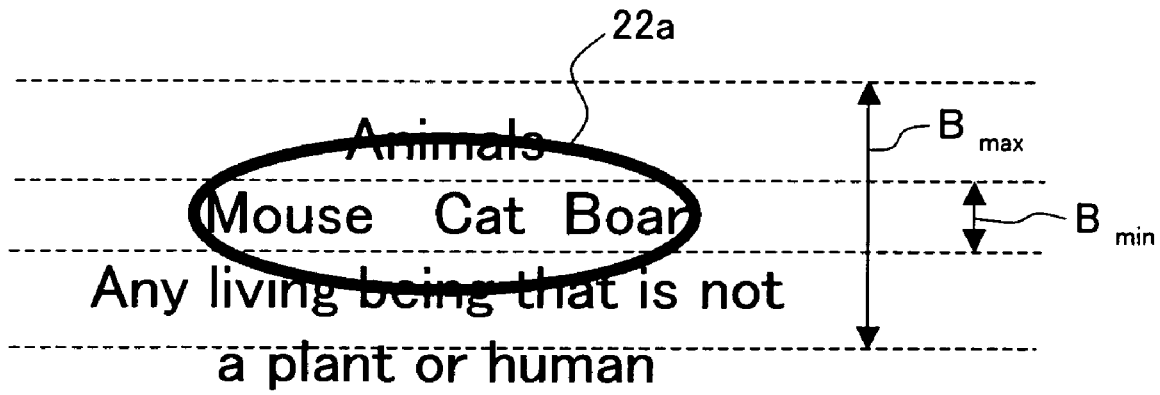
FIGS. 9A and 9B respectively show an exemplary display image in the case where an oval mark and an image are displayed under the condition of overlapping each other.
Figure 9B:
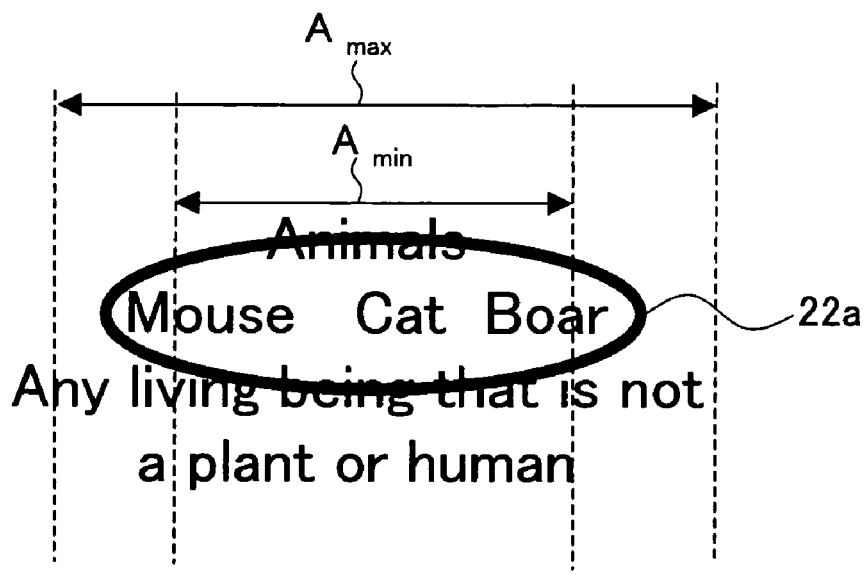

Herein, an exemplary change range of the major axis and the minor axis of the oval will be described with reference to FIGS. 9A and 9B. FIGS. 9A and 9B show an example in the case where an oval mark and an image containing characters are displayed under the condition of overlapping each other. The minor axis of the oval of the mark 22a shown in FIG. 9A gradually changes from $B_{min}$ to $B_{max}$, and a value representing the overlapping degree between the oval and the characters is obtained in each stage. $B_{min}$ corresponds to the above-mentioned $B_0$, and $B_{max}$ corresponds to $(B_0+K \times \Delta B)$.

The major axis of the oval of the mark 22a shown in FIG. 9B gradually changes from $A_{min}$ to $A_{max}$, and a value representing the overlapping degree between the oval and the character is obtained in each stage. $A_{min}$ corresponds to the above-mentioned $A_0$, and $A_{max}$ corresponds to $(A_0+N \times \Delta A)$.

In Op 410, in the examples shown in FIGS. 9A and 9B, a value representing the overlapping degree between the mark 22a and the characters in the case where the major axis of the oval of the mark 22*a* is changed variously from $A_{min}$ to $A_{max}$ and the minor axis thereof is changed variously from $B_{min}$ to $B_{max}$.

The adjusting part 11 obtains an optimum length of the major axis and an optimum length of the minor axis from the value representing the overlapping degree between the mark and the character, graphic, or picture in the case where the major axis and the minor axis of the oval that is the shape of a mark are variously deformed, obtained in the processings in Op401 to Op409.

For example, the adjusting part 11 can set the combination of the length of a major axis and the length of a minor axis in which the sum of the change number of times and the number of black pixels is smaller than those of any other combinations to be an optimum length of the major axis and an optimum length of the minor axis. At this time, in the case where there are a plurality of combinations of the length of the major axis and the length of the minor axis in which the sum of the change number of times and the number of black pixels is smaller than those of any other combinations, the adjusting part 11 selects an oval in which the lengths of the major axis and the minor axis are maximum. As an oval is larger, it is closer to an originally drawn oval. Therefore, by selecting an oval in which the lengths of the major axis and the minor axis are maximum, the oval closer to the oval inputted as an enclosing mark can be selected as an optimum oval.

Thus, the adjusting part 11 can obtain an optimum oval shape in which the overlapping between the mark and the character, graphic, or picture is reduced. In Op410, the method for obtaining an optimum position is not limited to the above example. Furthermore, in the above example, although the length of the major axis and the length of the minor axis are used as parameters representing the shape of the oval, the parameters representing the shape of an oval are not limited to the length of the major axis and the length of the minor axis.

Herein, the investigation method for gradually increasing the lengths of the minor axis and the major axis of the oval from the minimum value has been described. However, the following investigation method is also considered: the lengths of the minor axis and the major axis are gradually decreased, with the maximum values of the major axis and the minor axis being set to be the lengths of a horizontal side and a vertical side of a circumscribed rectangle of an oval of the mark 22*a* after recognition. In this case, even when a plurality of lines are enclosed, the investigation can be finished at a time when an oval whose overlapping degree is small is found.

There may be the case where the overlapping with the character, graphic, or picture increases even when the adjusting part 11 adjusts the shape or position of the mark. For example, the sum of the change number of times of the brightness and the number of black pixels counted in Op405 exceeds a predetermined ratio among the total number of pixels contained in the acquired pixel information, and the like, the color of a part of the mark (overlapping part) may be rendered transparent or semi-transparent. This enables the character, graphic, or picture covered by overlapping with the mark to be seen.

Thus, in the case where the overlapping degree with the character, graphic, or picture is high even after the adjustment by the adjusting part 11, the adjusting part 11 adjusts the color of the mark so that the color of a part of the mark becomes transparent or semi-transparent. The color of the mark can be adjusted by updating the data representing the mark recorded in the mark recording part 6. In the case of rendering a part of the mark transparent, the adjusting part 11 can determine a portion to be rendered transparent, for example, based on the pixel information of an image overlapping the mark.

Thus, the exemplary cases in which the path of the inputted mark is converted into a rectangle and into an oval by the figure recognizing part 7 have been described with reference to FIGS. 4 and 8. However, the adjusting part 11 may adjust the position or shape of the mark represented by the inputted handwriting data, without performing conversion of the path of the mark by the figure recognizing part 7. In this case, the adjusting part 11 can obtain, for example, a circumscribed rectangle of the path of the mark represented by the handwriting data, and regarding the rectangle thereof, calculate an optimum position of the mark in the same way as in the processing of a rectangle in FIG. 4. The investigation range in this case can be set to be the same as that in the case of the investigation for obtaining an optimum position regarding the above rectangle, based on a circumscribed rectangle. The image acquiring part 9 acquires an image in a portion overlapping a mark represented by handwriting data, and the adjusting part 11 calculates the overlapping degree between the mark and the character, graphic, or picture contained in the image.

Figure 10A:
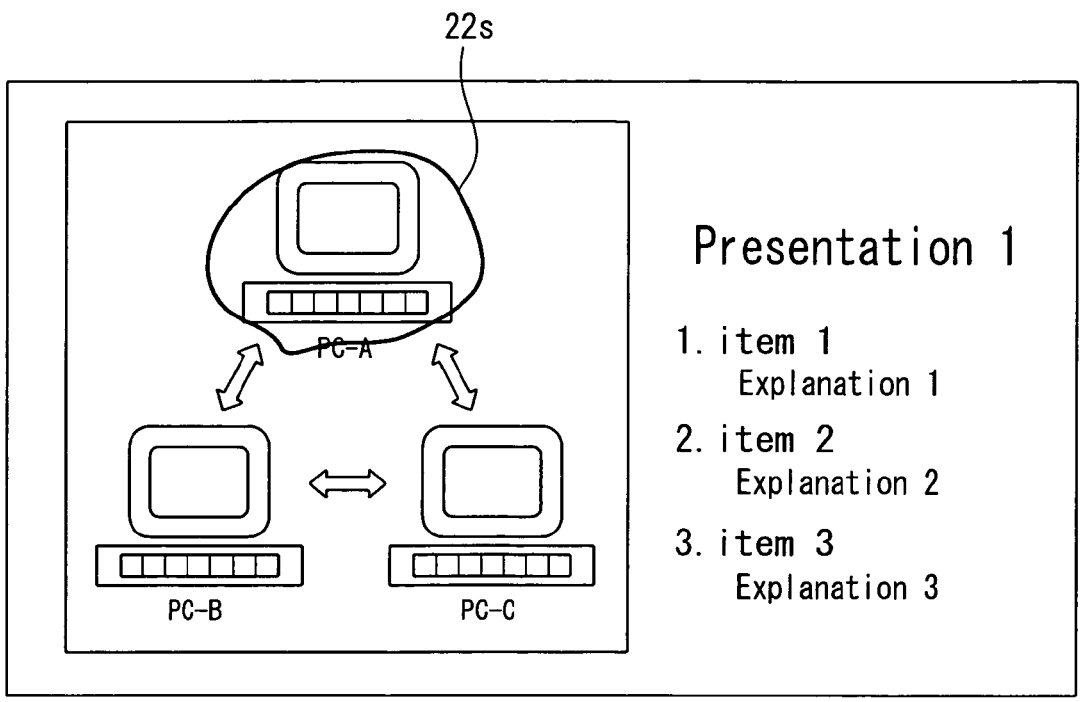
FIG. 10A and 10B respectively show an exemplary display image in the case where a mark is inputted to an image containing a graphic.
Figure 10B:
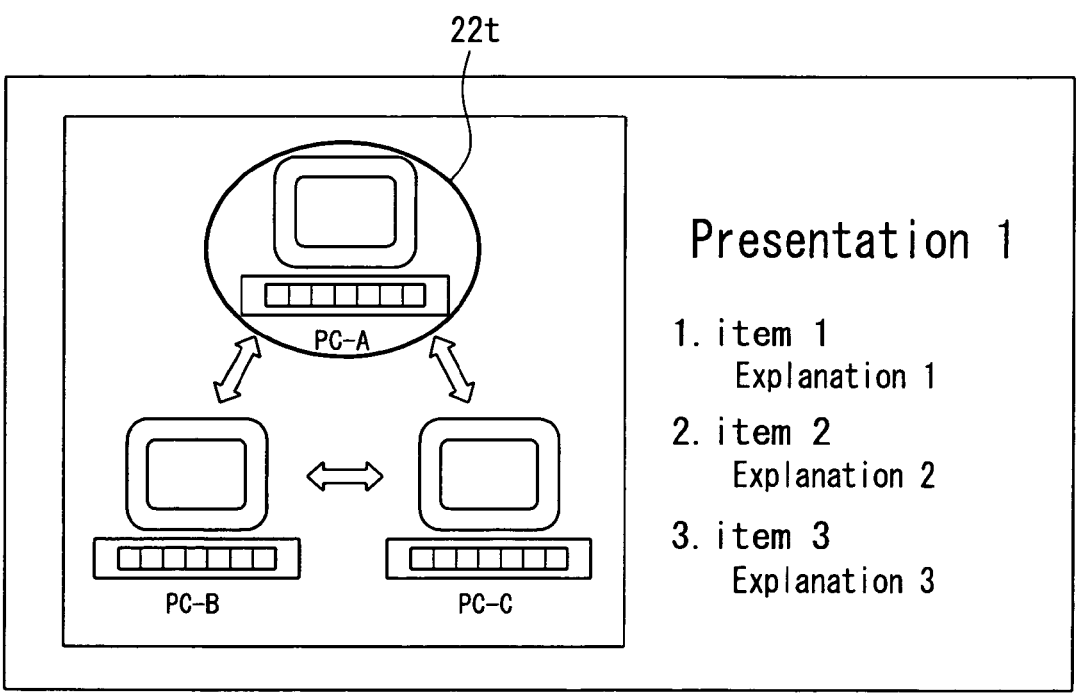

Furthermore, in the above embodiment, an exemplary case where the mark and the characters overlap each other has been described. However, for example, the case where a mark and a graphic overlap each other, and the case where a mark and a picture overlap each other are the same as the above embodiment. FIGS. 10A and 10B show an exemplary display image in the case where a mark is inputted in an image containing a graphic. In FIG. 10A, a mark 22*s* inputted by the input apparatus 12 is displayed as it is under the condition of overlapping the image. In FIG. 10B, a mark 22*t* converted and adjusted by the graphic recognizing part 7 and the adjusting part 11 is displayed. The mark 22*t* is obtained by adjusting the mark 22*s* by the adjusting part 11 so that the overlapping with the graphic contained in the image is reduced.

Furthermore, in the above embodiment, the example has been described in which the data representing handwriting is inputted in the information processing apparatus 1 as data representing a mark. However, a mark to be inputted is not limited to handwriting. For example, graphic data generated by software that automatically draws a line segment, a rectangle, an oval, or the like based on the operation of a user may be inputted as data representing a mark.

Embodiment 2

Figure 11:
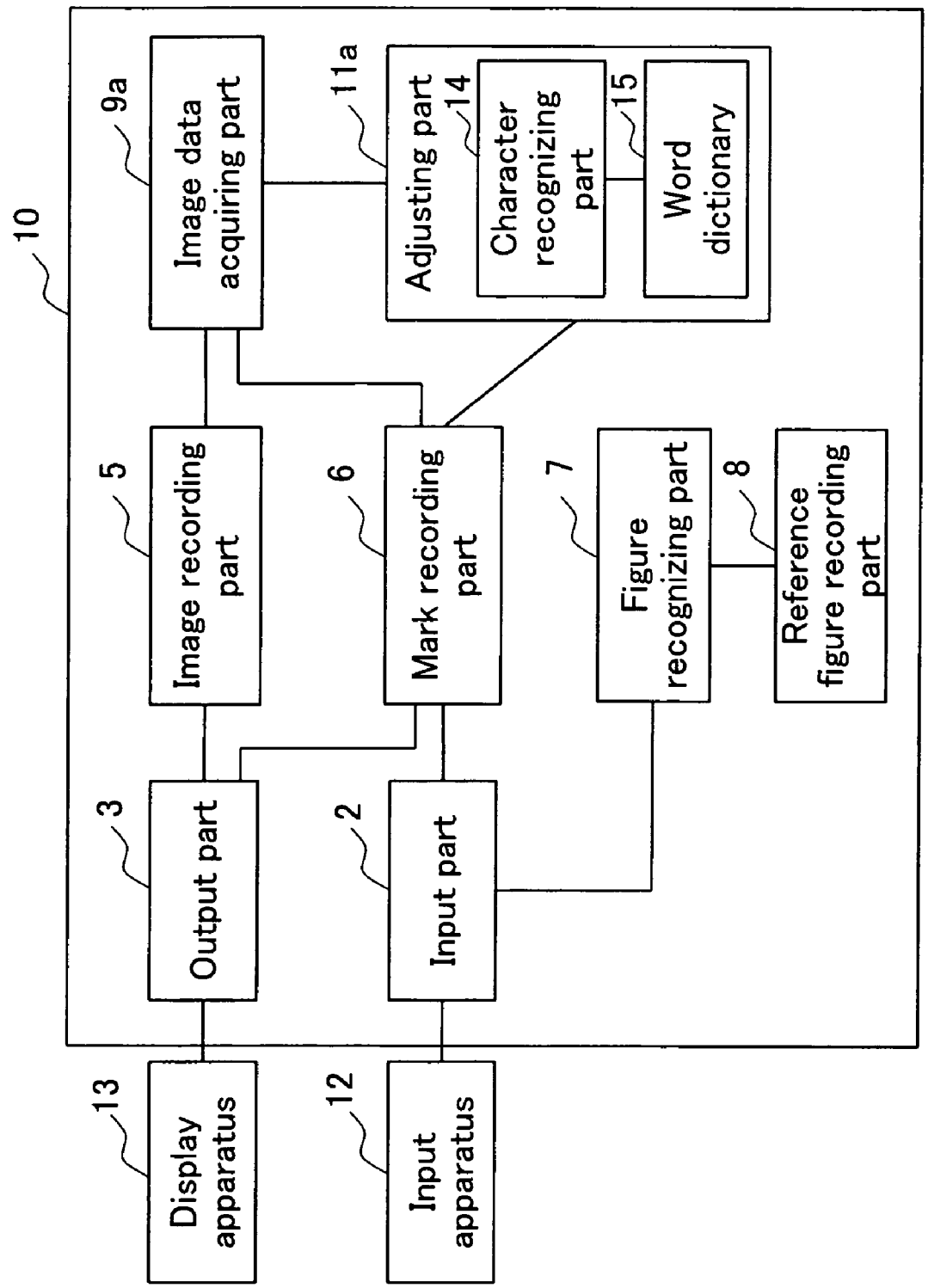
FIG. 11 is a functional block diagram showing a configuration of an information processing apparatus according to Embodiment 2.

FIG. 11 is a functional block diagram showing a configuration of an information processing apparatus according to the present embodiment. In FIG. 11, the same parts as those in the functional block shown in FIG. 1 are denoted with the same reference numerals as those therein, and the description thereof will be omitted. In an information processing apparatus 10 shown in FIG. 11, an adjusting part 11*a* includes a character recognizing part 14 and a word dictionary 15. The adjusting part 11*a* has a function of adjusting the position or shape of a mark so that the overlapping with a character, graphic, or picture contained in an image are reduced, in the same way as in Embodiment 1. An image data acquiring part 9*a* acquires data that represents an image in the vicinity of a mark recorded in a mark recording part 6 from an image recording part 5, and gives the data to the adjusting part 11*a*.

The character recognizing part 14 recognizes characters contained in an image represented by partial image data received from the image data acquiring part 9*a*. The character recognizing part 14 has a function of identifying characters from the partial image data and a function of recognizing a word from the identified characters. When the character recognizing part 14 recognizes the word, the word dictionary 15 that is previously provided is used. A plurality of words are recorded in the word dictionary 15. The function of identifying the characters from the partial image data can be realized using, for example, an existing optical character recognition (OCR) technique.

Next, an example of the processing will be described in which the adjusting part 11a and the image data acquiring part 9a adjust a mark recorded in the mark recording part 6. The rough flow of the operation of the information processing apparatus 10 that receives an input of a mark from the input apparatus 12 and displays the mark in the display apparatus 13 is the same as that of the processing shown in FIG. 3. The mark adjustment processing in Op4 in the flowchart in FIG. 3 is different from that in Embodiment 1. Therefore, the processing in Op4 will be described below.

Figure 12:
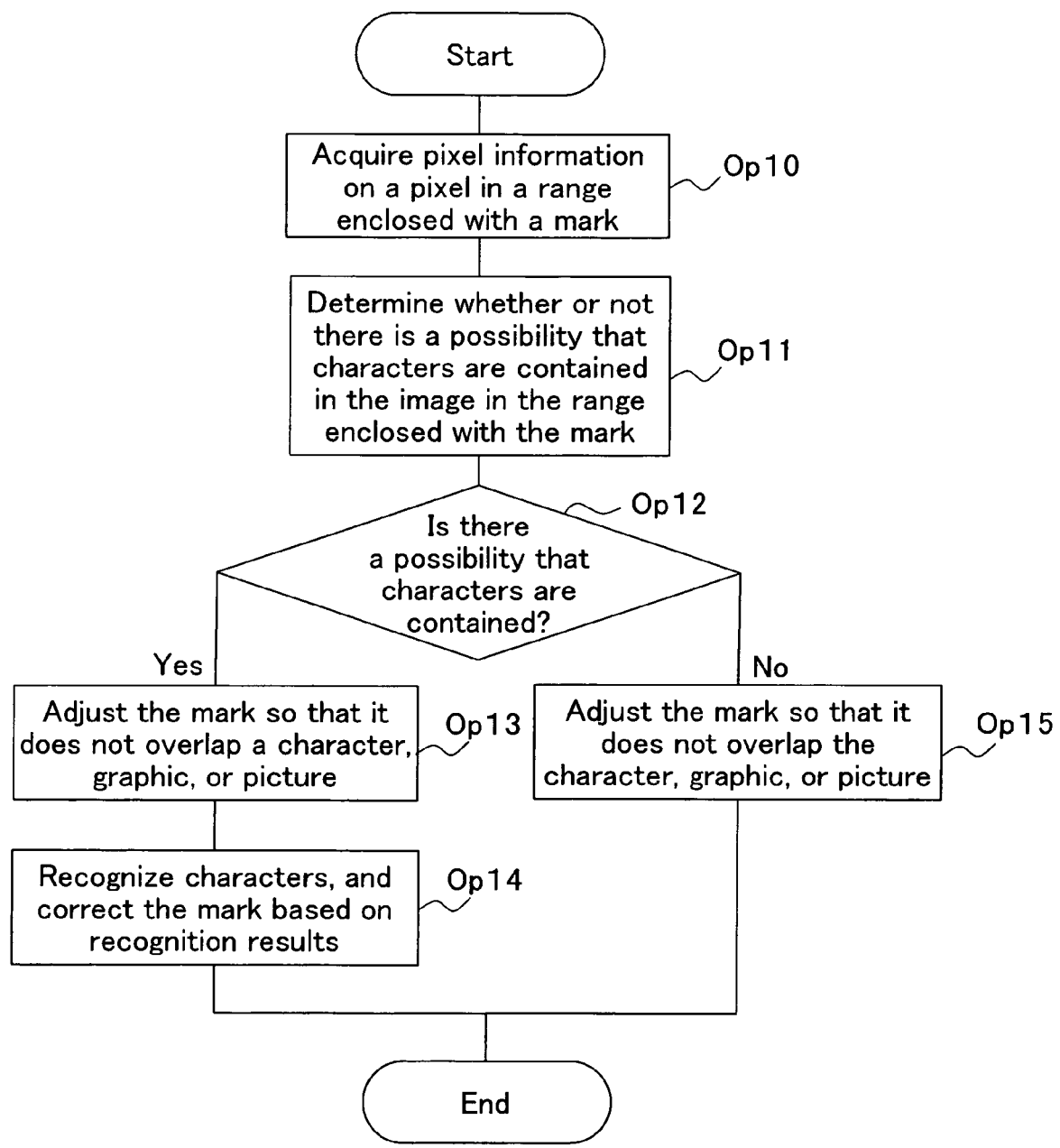
FIG. 12 is a flowchart showing an example of the processing of adjusting a circular enclosing mark or a rectangular enclosing mark.

FIG. 12 is a flowchart showing an example of the processing in which the adjusting part 11a adjusts a circular enclosing mark or a rectangular enclosing mark recorded in the mark recording part 6. As shown in FIG. 12, first, the image data acquiring part 9a acquires pixel information on a portion of an image enclosed with a mark from the image recording part 5, and gives the pixel information to the adjusting part 11a (Op 10). The adjusting part 11a determines whether or not there is a possibility that characters may be contained in a range enclosed with the mark, based on the given pixel information on the range enclosed with the mark (Op11).

A specific example of the processing of determination will be described regarding the case where an image is a gray-scale image. The adjusting part 11a calculates the change degree of the brightness representing shades of gray between adjacent pixels, regarding respective pixels in the range enclosed with the mark. In the case where there are a number of parts having a large change degree of the brightness representing shades of gray, the possibility that characters are contained in the range enclosed with the mark becomes high. Therefore, the adjusting part 11a can determine that there is a possibility that characters may be contained in the range enclosed with the mark, in the case where there are a predetermined number or more parts in which the change degree of the brightness between adjacent pixels exceeds a previously set threshold value in the range enclosed with the mark.

In the case where it is determined that there is a possibility that characters are contained in the range enclosed with the mark (Yes in Op12), the adjusting part 11a adjusts the mark so that the overlapping with the character, graphic, or picture contained in the image is reduced (Op13). The processing in Op13 is the same as that shown in FIG. 4 or that shown in FIG. 8 in Embodiment 1. The adjusting part 11a corrects the range enclosed with the adjusted mark (Op14). The adjusting part 11a recognizes characters in the enclosing of the mark, and corrects the enclosing range based on recognition results. A specific example of the processing in Op14 will be described later. Because of this, a mark is adjusted so as to enclose characters in a reasonable range.

On the other hand, in the case where it is determined that there is no possibility that characters may not be contained in the range enclosed with the mark from the results of the processing in Op11 (No in Op12), the adjusting part 11a adjusts the mark so that the overlapping with the character, graphic, or picture contained in the image is reduced (Op15). The processing in Op15 is the same as that in Op13. In the case where characters are contained in the range enclosed with the mark as a result of the processing shown in FIG. 12, the adjusting part 11a corrects the mark in accordance with the recognition results of a character string constituted by the characters.

Figure 13:
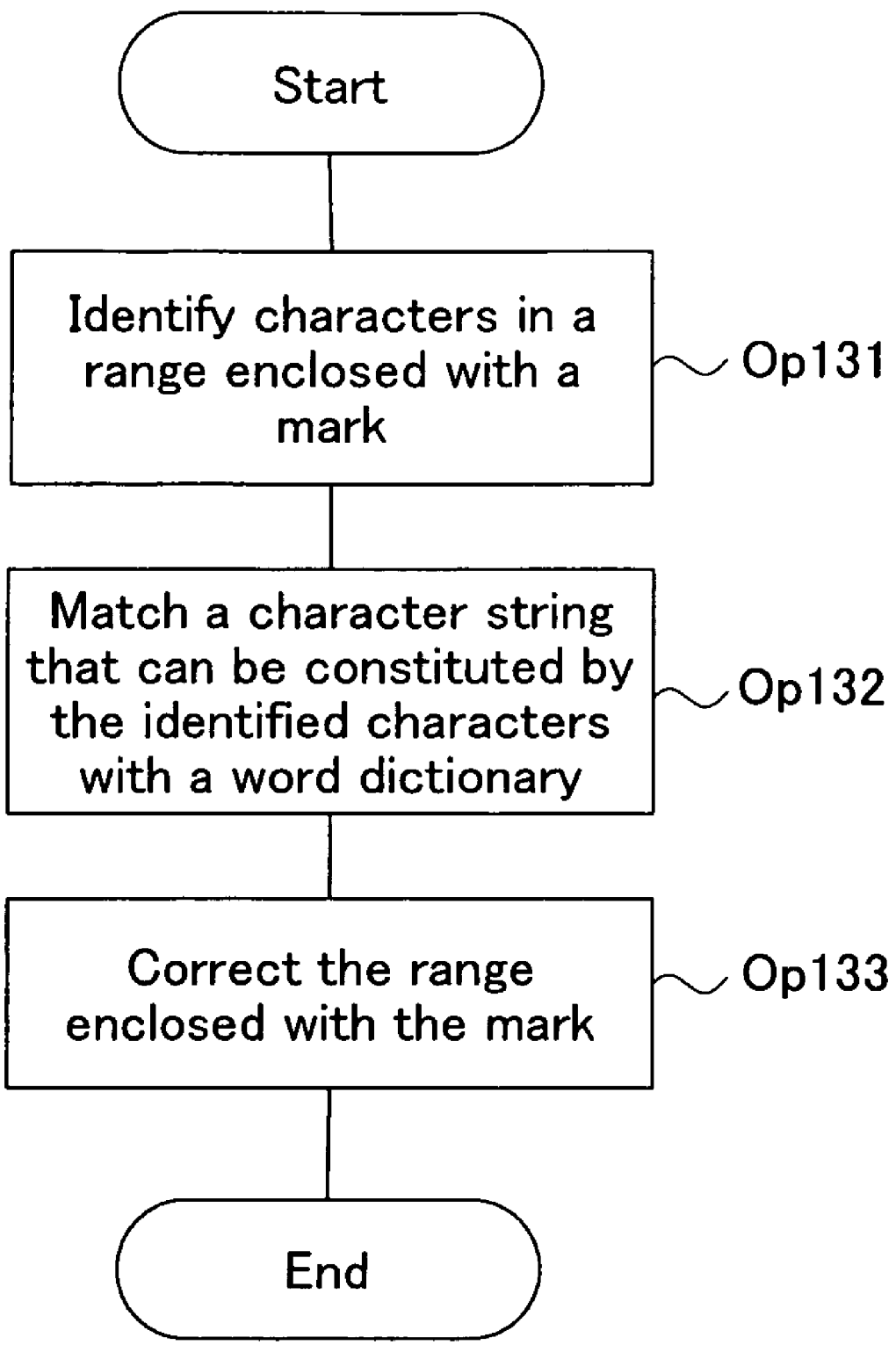
FIG. 13 is a flowchart showing the processing of correcting an adjusted mark.

Herein, in Op14 shown in FIG. 12, a specific example of the processing in which the adjusting part 11a corrects the adjusted mark will be described. FIG. 13 is a flowchart showing a specific example of the detailed processing in Op14. As shown in FIG. 13, the character recognizing part 14 first identifies characters contained in an image in the range enclosed with the mark from the pixel information in an image in the range (Op131). For the identification of characters, the existing OCR technique can be used. The character recognizing part 14 obtains, for example, data representing one or a plurality of characters contained in the range enclosed with the mark, and data representing the positions of pixels constituting respective characters, as the results of the character recognition processing.

The character recognizing part 14 matches the characters in the range enclosed with the mark, with the word dictionary 15 (Op132). The character recognizing part 14 matches the respective character strings constituted by the characters in the range enclosed with the mark, with the word dictionary 15 to calculate a matching degree (score). The character recognizing part 14 extracts a character string having a highest matching degree among the character strings that can be constituted by the characters in the range enclosed with the mark.

Figure 14A:
FIG. 14A shows an image in the case where an adjusted mark is displayed under the condition of overlapping a part of a character string.

A specific example of the matching between the character strings and the word dictionary 15 will be described with reference to FIGS. 14A and 14B. FIG. 14A shows an image in the case where a mark 21c adjusted by the adjusting part 11a is displayed under the condition of overlapping a part of a character string contained in an image. In the example shown in FIG. 14A, the mark 21c partitions the third character into two portions (first half and second hall as a result of the adjustment by the adjusting part 11a. In the processing in Op131, the character recognizing part 14 identifies the first character, and the second character+the first half of the third character, as the characters in the range enclosed with the mark 21c. At this time, the character recognizing part 14 outputs, as recognition candidates, three character strings (first character+second character+front half of third character, first character+second character, second character+front half of third character), for example, as the character strings constituted by the first character, the second character, and the first half of the third character. After that, the character recognizing part 14 matches these three character strings with the word dictionary 15. Assuming that a word of the first character+the second character is recorded, and a word of the first character+the second character+the first half of the third character and a word of the second character and the first half of the third character are not recorded in the word dictionary 15, the matching degree of the first character+the second character becomes highest, as a result of the matching by the character recognizing part 14. From this, the enclosing by a person who draws a mark is interpreted as enclosing the first character+the second character of the character string.

The adjusting part 11a corrects a mark based on the matching results of the character recognizing part 14 (Op133). For example, the character recognizing part 14 has cut-out information representing from which position an image of characters constituting each word is cut out. Therefore, the adjusting part 11a can acquire data representing a range of pixels constituting a character string having a highest matching degree (score) with the word dictionary 15 (first character+second character in the example shown in FIG. 14A) from the character recognizing part 14, and correct a mark based on the data. Consequently, the adjusting part 11a can correct a mark so that the mark encloses the character string having a highest matching degree.

Figure 14B:
FIG. 14B shows a specific example of a corrected mark in the case where the mark shown in FIG. 14A is corrected.

For example, a mark 21c shown in FIG. 14A is corrected to a mark 21d shown in FIG. 14B. More specifically, as a result of the matching with the word dictionary 15 by the character recognizing part 14, the mark 21c is corrected so as to enclose the character string having a highest matching degree (first character+second character).

Figure 15A:
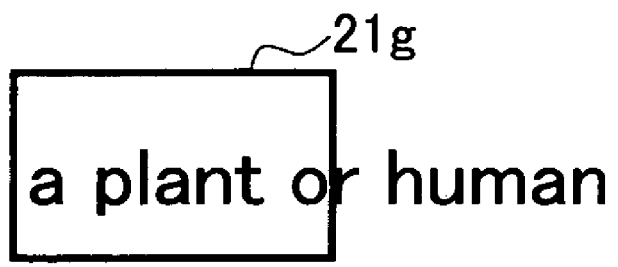
FIG. 15A shows an image in the case where an adjusted mark is displayed under the condition of overlapping a part of an English character string.
Figure 15B:
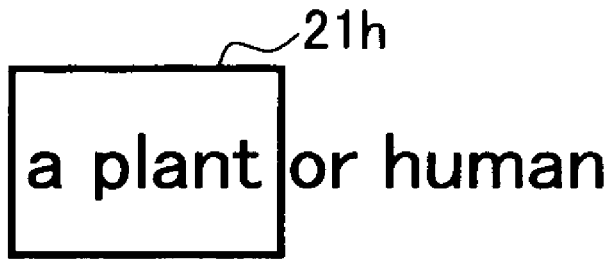
FIG. 15B shows a specific example of a corrected mark in the case where the mark shown in FIG. 15A is corrected.

FIGS. 15A and 15B show an example of the correction of a mark in the case where a character string of an image is written in English. In the example shown in FIG. 15A, as a result of the adjustment by the adjusting part 11a, the mark 21c partitions a word "or" between "o" and "r". The word recognizing part 14 identifies "a", "plant", and "o" as words in a range enclosed with the mark 21g in the processing in Op131. At this time, the character recognizing part 14 matches the respective character strings "a plant" and "plant o", as character strings constituted by "a", "plant", and "o", with the word dictionary 15. Assuming that the character string "a plant" is recorded and the character string "plant o" is not recorded in the word dictionary 15, the matching degree of "a plant" becomes highest as a result of the matching by the character recognizing part 14. The mark 21g shown in FIG. 15A is corrected to a mark 21h shown in FIG. 15B. More specifically, as a result of the matching with the word dictionary 15 by the character recognizing part 14, the mark 21g is corrected so as to enclose the character string "a plant" having a highest matching degree.

Thus, by correcting the mark based on the character string recognized by the character recognizing part 14, the mark can be adjusted considering the character string. For example, even in the case where one character is separated by a mark due to the gap in the character, a mark falls on a portion between characters of a character string constituting one word, etc., the adjusting part 11a can correct a mark so that the mark separates a character string at an appropriate boundary.

In the present embodiment, the case where a mark is a circular enclosing or a rectangular enclosing has been described. However, marks in other shapes can also be corrected in accordance with a character string. For example, regarding a mark of a line segment for putting an underline to a character string can also be corrected for the length and the position in accordance with the character string.

Furthermore, in the present embodiment, the case has been described where image data representing an image is acquired as pixel information containing the position and brightness of each pixel as in a bitmapped image. However, the adjusting part 11a may obtain the position or shape of a mark with less overlapping with a text, using text data and data representing the position (hereinafter, referred to as a text position) of each pixel in an image where a text of the text data is displayed, instead of the pixel information containing the position and brightness of each pixel as in a bitmapped image. Furthermore, the adjusting part 11a may obtain the position or shape of a mark with less overlapping with an image or a picture, using data representing a graphic or a picture and data representing the position (hereinafter, referred to as a graphic position) of each pixel where the graphic or the picture is displayed. The data representing the text position or the graphic position can be obtained using, for example, a layout recognition technique of the OCR technique.

Furthermore, the information processing apparatus according to the present invention is not limited to the case where it is used as a presentation apparatus. The present invention is also applicable to, for example, an electronic paper and an electronic book in which a mark can be described.

The present invention is useful, for example, as an information processing apparatus capable of performing an effective presentation, lecture, or the like, in which a mark described at a presentation, a lecture, or the like does not cover a character, graphic, or picture of an image.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing apparatus connected to a display apparatus for displaying an image and an input apparatus, comprising:
    an image recording part to record image data that represents an image to be displayed by the display apparatus;
    an input part to receive handwriting data that represents a mark to be displayed under a condition of overlapping the image from the input apparatus;
    a mark recording part to record the handwriting data that represents the mark received by the input part;
    an image data acquiring part to acquire, in a case where at least a part of the mark is moved or deformed into a plurality of different positions or shapes respectively in a predetermined range in the image containing a position corresponding to the mark represented by the handwriting data recorded in the mark recording part, pixel information that represents a pixel group of a portion of the image overlapping the mark in each of the positions or shapes after the movement or deformation from the image data;
    an adjusting part to calculate a value that represents an overlapping degree between the mark in each of the plurality of different positions or shapes after the movement or deformation and a character, graphic, or picture contained in the image, using the pixel information, with respect to each of the positions or shapes after the movement or deformation, to obtain a position or shape of the mark whose overlapping degree represented by the value is lowest, and to record the position or shape in the mark recording part; and
    an output part to allow the display apparatus to display the mark represented by the handwriting data received by the input part under a condition that the mark overlaps the image at a time of input, and to allow the display apparatus to display the mark in the position or shape obtained by the adjusting part under a condition that the mark overlaps the image, after deleting a display of the mark represented by the handwriting data.

2. The information processing apparatus according to claim 1, further comprising:
    a reference figure recording part to store data that represents a plurality of reference figures to be used for figure recognition; and
    a figure recognizing part to perform figure recognition with respect to the handwriting data with reference to the reference figure recording part, thereby recognizing a figure to be converted among the plurality of reference figures.

3. The information processing apparatus according to claim 1, wherein the image data acquiring part acquires, as the pixel information, data containing a position and a pixel value of each pixel in the pixel group contained in the portion of the image overlapping the mark, with respect to the mark in each of the plurality of different positions or shapes after the movement or deformation, and the adjusting part calculates a value that represents an overlapping degree between the mark and a character, graphic, or picture contained in the image, using the value that represents a dispersion degree of the pixel value in the pixel group contained in the portion of the image overlapping the mark, with respect to the mark in each of the plurality of different positions or shapes after the movement or deformation.

4. The information processing apparatus according to claim 3, wherein the adjusting part uses the number of parts where the pixel value changes by a predetermined value or more between adjacent pixels in the pixel group, as the value that represents the dispersion degree of the pixel value in the pixel group contained in the portion of the image overlapping the mark.

5. The information processing apparatus according to claim 3, wherein the adjusting part uses a variance of the pixel value of a pixel contained in the pixel group, as the dispersion degree of the pixel value in the pixel group contained in the portion of the image overlapping the mark.

6. The information processing apparatus according to claim 1, wherein the adjusting part recognizes a character contained in the image in the predetermined range, using the pixel information that represents the pixel group in the image in the predetermined range containing the position corresponding to the mark represented by the data recorded in the mark recording part, and corrects the position or shape of the mark based on the recognized character.

7. The information processing apparatus according to claim 1, wherein the adjusting part adjusts a color of the mark so as to render at least a part of the adjusted mark transparent or semi-transparent.

8. An information processing method by a computer that is connected to a display apparatus for displaying an image and an input apparatus and includes an image recording part for recording image data that represents an image to be displayed by the display apparatus and a mark recording part for recording data that represents a mark to be displayed under a condition of overlapping the image, the method comprising:

an input process in which an input part provided in the computer receives handwriting data that represents a mark to be displayed under a condition of overlapping the image from the input apparatus, and records the handwriting data in the mark recording part;

an acquiring process in which, in a case where at least a part of the mark is moved or deformed into a plurality of different positions or shapes respectively in a predetermined range in the image containing a position corresponding to the mark represented by the handwriting data recorded in the mark recording part, an image data acquiring part provided in the computer acquires pixel information that represents a pixel group of a portion of the image overlapping the mark in each of the positions or shapes after the movement or deformation from the image data;

an adjusting process in which an adjusting part provided in the computer calculates a value that represents an overlapping degree between the mark in each of the plurality of different positions or shapes after the movement or deformation and a character, graphic, or picture contained in the image, using the pixel information, with respect to each of the positions or shapes after the movement or deformation, obtains a position or shape of the mark whose overlapping degree represented by the value is lowest, and records the position or shape in the mark recording part; and an output process in which an output part provided in the computer allows the display apparatus to display the mark represented by the handwriting data received by the input part under a condition that the mark overlaps the image at a time of input, and allows the display apparatus to display the mark in the position or shape obtained by the adjusting part under a condition that the mark overlaps the image, after deleting a display of the mark represented by the handwriting data.

9. An information processing program stored in a recording medium for causing a computer, which is connected to a display apparatus for displaying an image and an input apparatus, and includes an image recording part for storing image data that represents an image to be displayed by the display apparatus, to execute:

input processing of receiving handwriting data that represents a mark to be displayed under a condition of overlapping the image from the input apparatus, and recording the handwriting data in the mark recording part;

image data acquiring processing of, in a case where at least a part of the mark is moved or deformed into a plurality of different positions or shapes respectively in a predetermined range in the image containing a position corresponding to the mark represented by the handwriting data recorded in the mark recording part, acquiring pixel information that represents a pixel group of a portion of the image overlapping the mark in each of the positions or shapes after the movement or deformation from the image data;

adjusting processing of calculating a value that represents an overlapping degree between the mark in each of the plurality of different positions or shapes after the movement or deformation and a character, graphic, or picture contained in the image, using the pixel information, with respect to each of the positions or shapes after the movement or deformation, obtaining a position or shape of the mark whose overlapping degree represented by the value is lowest, and recording the position or shape in the mark recording part; and output processing of allowing the display apparatus to display the mark represented by the handwriting data received in the input processing under a condition that the mark overlaps the image at a time of input, and allowing the display apparatus to display the mark in the position or shape obtained in the adjusting processing under a condition that the mark overlaps the image, after deleting a display of the mark represented by the handwriting data.

* * * * *